(12) United States Patent
Nicholls et al.

(10) Patent No.: US 12,737,441 B2
(45) Date of Patent: Sep. 15, 2026

(54) LOCAL ATTRIBUTE VERIFICATION USING A COMPUTING DEVICE

(71) Applicant: Fujitsu Services Limited, Bracknell (GB)

(72) Inventors: David Nicholls, Bracknell (GB); Gary Fegan, Bracknell (GB)

(73) Assignee: Fujitsu Services Limited, Bracknell (GB)

( * ) Notice: Subject to any disclaimer, the term of this patent is extended or adjusted under 35 U.S.C. 154(b) by 127 days.

(21) Appl. No.: 18/720,017

(22) PCT Filed: Dec. 14, 2022

(86) PCT No.: PCT/GB2022/053236

§ 371 (c)(1),
(2) Date: Jun. 14, 2024

(87) PCT Pub. No.: WO2023/111566

PCT Pub. Date: Jun. 22, 2023

(65) Prior Publication Data

US 2025/0061177 A1 Feb. 20, 2025

(30) Foreign Application Priority Data

Dec. 15, 2021 (EP) .................................... 21214682

(51) Int. Cl.
*G06F 21/00* (2013.01)
*G06F 21/32* (2013.01)
*G06V 40/12* (2022.01)

(52) U.S. Cl.
CPC .......... *G06F 21/32* (2013.01); *G06V 40/1365* (2022.01)

(58) Field of Classification Search
CPC ................ G06F 21/32; G06V 40/1365; H04L 2463/082; H04L 63/0861; G06K 19/06037
See application file for complete search history.

(56) References Cited

U.S. PATENT DOCUMENTS 11,182,774 B1 11/2021 Boyd et al.
11,432,149 B1 * 8/2022 Dhanoa .................. G06F 21/36
(Continued)

FOREIGN PATENT DOCUMENTS

GB 2587075 A 3/2021

OTHER PUBLICATIONS

PCT International Search Report and Written Opinion dated Jan. 25, 2023, corresponding to Application No. PCT/GB2022/053236, 14 pages.

*Primary Examiner* — William A Corum, Jr.
(74) *Attorney, Agent, or Firm* — Barley Snyder

(57) ABSTRACT

A computer-implemented method of locally verifying an attribute associated with a user is disclosed. The method comprises performing, by a computing device, steps including: capturing biometric verification data using the computing device; determining whether the biometric verification data corresponds to the user by comparing the biometric verification data with authenticated biometric data of the user previously obtained from an identity document, ID, and stored locally on the computing device; and in response to determining that the biometric verification data corresponds to the user, verifying the attribute associated with the user based on attribute information associated with the user previously obtained from the ID and stored locally on the computing device.

16 Claims, 8 Drawing Sheets

(56) References Cited

U.S. PATENT DOCUMENTS

| | | | | |
|---|---|---|---|---|
| 2003/0177102 | A1* | 9/2003 | Robinson | G06Q 20/401 705/75 |
| 2013/0138570 | A1 | 5/2013 | Ross | |
| 2017/0264608 | A1* | 9/2017 | Moore | G07C 9/257 |
| 2017/0346851 | A1 | 11/2017 | Drake | |
| 2018/0176017 | A1* | 6/2018 | Rodriguez | H04L 63/20 |
| 2018/0189583 | A1 | 7/2018 | Wohlken et al. | |
| 2019/0034610 | A1* | 1/2019 | Miu | G06V 30/413 |
| 2019/0050921 | A1* | 2/2019 | Ryner | G06Q 20/326 |
| 2020/0098023 | A1* | 3/2020 | Agarwal | G06Q 20/3227 |
| 2020/0140256 | A1* | 5/2020 | Setchell | G01P 13/00 |
| 2020/0311237 | A1* | 10/2020 | De Vos | G07C 9/253 |
| 2020/0315261 | A1* | 10/2020 | Hubbard | A24F 40/53 |
| 2021/0011446 | A1* | 1/2021 | Anderson | G06K 19/06037 |
| 2021/0117524 | A1* | 4/2021 | Mckell-Redwood | H04L 9/3231 |
| 2021/0117656 | A1* | 4/2021 | Garcia | G06F 21/32 |
| 2021/0165862 | A1* | 6/2021 | Agrawal | G06F 16/2379 |
| 2022/0180342 | A1* | 6/2022 | Eaton | G06Q 30/06 |
| 2023/0115383 | A1* | 4/2023 | Poirier, IV | H04L 63/102 726/7 |
| 2023/0252452 | A1* | 8/2023 | Capurso | G06Q 20/352 705/71 |
| 2024/0195622 | A1* | 6/2024 | Hanson | G06F 21/45 |
| 2024/0403481 | A1* | 12/2024 | V. Gaviola | G06F 21/32 |

* cited by examiner

Verification Phase

User 201

(c)

Device 200

(d)

Querying Authority 108

Fig 2

Registration Phase

User 201

(a)

Device 200

(b)

ID 202

Fig 5
501
X Store
Oxford Street, London
501
503
X Store
OVER 18
Wed 06 Jan 2021
13:29:43
500

601
Authenticated data and attribute information made accessible to more than one application by first software application 603
Second software application accesses authenticated data and attribute information 605
Second software application configured for attribute verification 607
Verify attribute using second software application

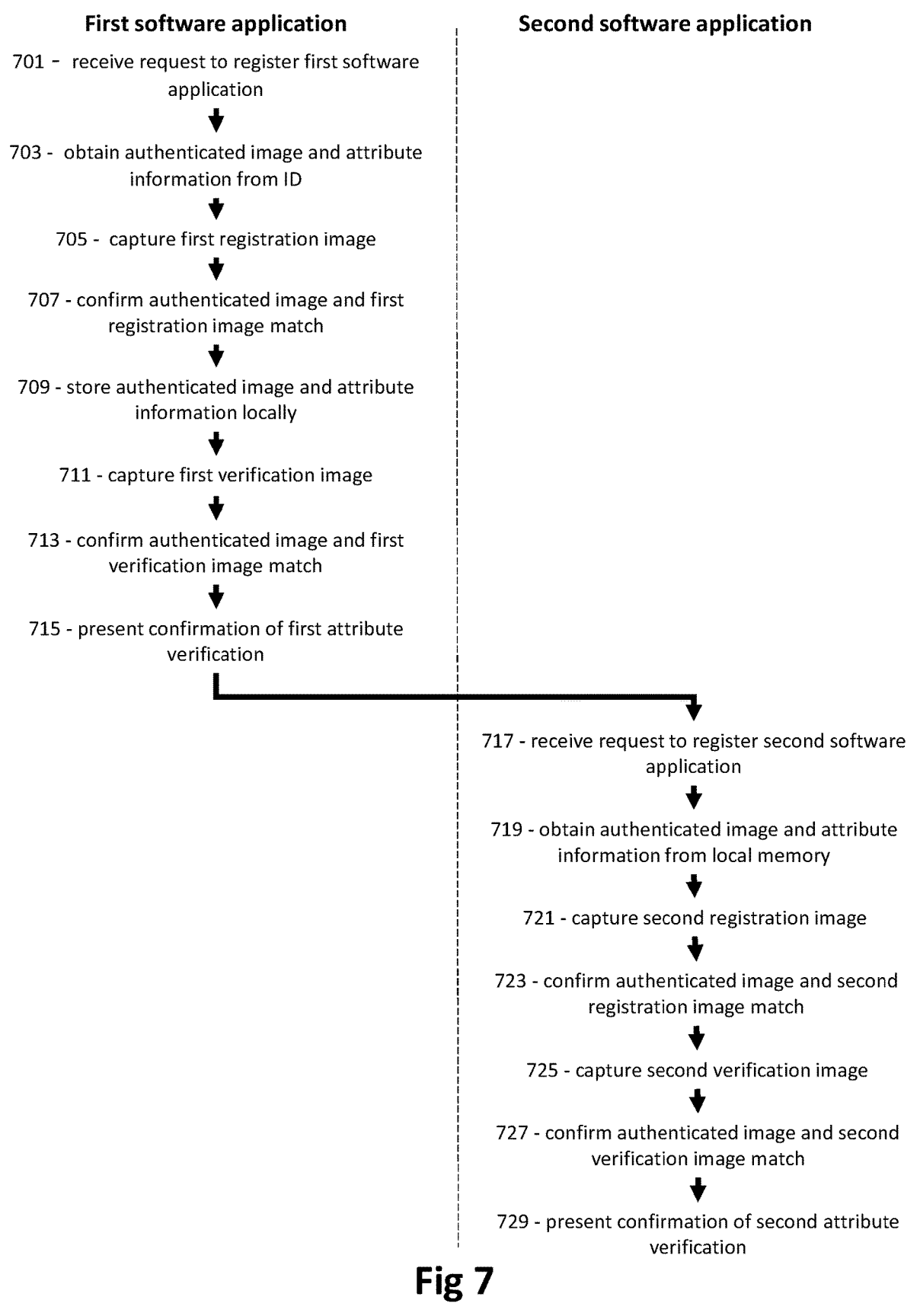

First software application

701 - receive request to register first software application

703 - obtain authenticated image and attribute information from ID

705 - capture first registration image

707 - confirm authenticated image and first registration image match

709 - store authenticated image and attribute information locally

711 - capture first verification image

713 - confirm authenticated image and first verification image match

715 - present confirmation of first attribute verification

Second software application

717 - receive request to register second software application

719 - obtain authenticated image and attribute information from local memory

721 - capture second registration image

723 - confirm authenticated image and second registration image match

725 - capture second verification image

727 - confirm authenticated image and second verification image match

729 - present confirmation of second attribute verification

Fig 7

LOCAL ATTRIBUTE VERIFICATION USING A COMPUTING DEVICE

TECHNICAL FIELD

The present disclosure relates to systems and methods for verifying a user attribute, such as an age or identity of the user, using a computing device.

BACKGROUND

There is a frequent need in modern life for persons to verify, in other words certify or prove, an attribute of theirs. For example, in order to purchase certain goods or access certain venues, a user may need to verify that they are of a certain minimum age. Similarly, an identity (e.g. name) of the person may need to be verified to enter certain buildings, pass certain clearance or security checks, or access goods and services.

Historically, such attribute verification has been conducted using paper or hardcopy identity documents, IDs, such as passports, driving licenses or ID passes. This is disadvantageous because hardcopy identity documents can be easily lost, damaged, stolen, or forged. Additionally, the use of hardcopy IDs has limited the possibility for automated systems to perform transactions with a user in an automated manner. For example, at present age restricted items cannot typically be sold via automated systems such as vending machines or self-service checkouts, because of the need to inspect ID documents before such a transaction may take place. Similarly, automated entry to a restricted building or venue can be problematic for similar reasons.

More recently, due to advances in technology, some limited form of digital attribute verification has become possible, whereby a computing device such as a mobile phone is used in place of a traditional paper ID. However, such existing digital attribute verification systems have various technical drawbacks which have limited their widespread implementation.

The most common form of existing digital verification system involves a user signing up with a centralised authority which holds records or profiles for various users on a centralised server or database. In such a system, in order to verify themselves, a user signs up with the centralised authority and, typically, provides them with some form of personally identifiable information, PII, such as their name, date of birth, address and so on. Based on the PII, the central authority builds a profile for the user in question. When the user then subsequently wishes to verify an attribute, such as their age, the user transmits more PII to the server, which the server uses to match the user to one of the profiles it holds. In response, and assuming a match can be found, the central authority may certify or vouch for that user's credentials, for example by providing a confirmation to the user or to the party querying the user's attribute.

As will be apparent, this existing attribute verification system is dependent on the user being able to correspond with the centralised authority both at registration time and subsequently at verification time. This is disadvantageous because it makes the system reliant on the user having a good network connection (typically an internet connection) to function, both at registration and verification time. If the user finds themselves in a remote location or somewhere where their network connection is poor, they may be unable to complete the verification process. In the case of a transaction, this may result in the transaction not taking place or not completing. Where verification is required for entry to a venue, the user may be locked out of that venue and be unable to enter.

The known approach also requires a centralised authority to hold potentially sensitive PII data for all its users, and for that sensitive PII data to be transmitted both at registration and at verification stage between the user and the central authority. This presents a security and privacy weakness in the system, and data breaches where centralised authorities are hacked and the PII of potentially many users is made public are now commonplace as a result of systems of this nature.

As can be seen, existing digital attribute verification systems suffer from significant technical drawbacks. It would be advantageous to provide systems and methods which address one or more of these problems, in isolation or in combination.

Overview

This overview introduces concepts that are described in more detail in the detailed description. It should not be used to identify essential features of the claimed subject matter, nor to limit the scope of the claimed subject matter.

According to one aspect of the present disclosure, there is provided a computer-implemented method of locally verifying an attribute associated with a user, the method comprising performing, by a computing device, various steps. Such a method may be considered to relate to a verification phase, in that it allows a user to verify an attribute of theirs using a computing device.

The term "local" in this context means that the verification is performed locally by the computing device itself, as opposed to remotely by some centralised authority's server or database. Verification of an attribute may be considered as certification or proving of the attribute. For example, a person who verifies their age may demonstrate that they are of a certain minimum age to perform a particular act.

The disclosed method comprises performing, by the computing device, steps including: capturing biometric verification data using the computing device; determining whether the biometric verification data corresponds to the user by comparing the biometric verification data with authenticated biometric data of the user previously obtained from an identity document, ID, and stored locally on the computing device; and in response to determining that the biometric verification data corresponds to the user, verifying the attribute associated with the user based on attribute information associated with the user previously obtained from the ID and stored locally on the computing device.

Through these steps, the disclosed method provides a mechanism for attribute verification which can be performed locally using the computing device, entirely independently of any centralised authority or server. This approach removes the need for such a centralised authority to exist, thereby simplifying the system and avoiding the need for a central database of user PII. This in turn provides security and privacy benefits, because no PII needs to be transmitted to or from the central authority, and there is thus less scope for loss of sensitive data such as through a malicious hack to release user PII.

Further, because there is no need for communication with a central authority, the disclosed method is far more stable and reliable in locations where network connectivity is poor. For example, a user in a store located in a remote environment where network coverage is poor can still make use of the disclosed verification mechanism, because it occurs locally on the computing device and is not dependent on any communication with a central server or network. Similarly, in very crowded environments, such as in a sports stadium, the local network (for example, in the case of a mobile network, the local network cell) may be overloaded such that individual users are unable to access the network. The present verification mechanism would work also in such an environment, because no connection to a network is required, thus addressing a technical limitation of previous systems.

The disclosed verification mechanism may be considered an "offline" verification mechanism, in the sense that no connection to any network or centralised server is required at the time of verification. This is in stark contrast to existing verification mechanisms which rely on communication to and from a centralised server to verify user attributes. Such existing systems may be considered "online" verification mechanisms, because a network connection is a prerequisite for attribute verification to be possible.

In an implementation, the computing device comprises a mobile device, for example a mobile device of the user. The term "mobile device" is intended to mean any suitable mobile computing device, typically handheld, which can be transported by a user and used at a point of interrogation to verify an attribute. Examples of such mobile devices include but are not limited to mobile phones, smartphones, personal digital assistants (PDAs), laptops, tablets, and other "smart" mobile devices, such as smartwatches.

Where a mobile device is used to perform the disclosed methods, the disclosed mechanism provides the advantage of not requiring any dedicated verification hardware to be installed at the point of verification. Instead, the user simply utilises their own mobile device. This further simplifies the system, by utilising existing hardware rather than requiring new hardware to be installed. The user is also not required to have any PII scanned or stored by a third party device which they have no control over. Instead, the disclosed methods and system mean that PII is only ever stored on a user's own mobile device. By distributing PII over users' own devices, the chance of a single hack releasing data for multiple users is diminished.

In one implementation, the biometric verification data comprises a verification image captured using a camera of the computing device and the authenticated biometric data comprises an authenticated image of the user previously obtained from the ID. In this case, mechanisms such as facial recognition can be used to determine whether the biometric verification data (i.e. the verification image) corresponds to (i.e. depicts) the user, through a comparison with the authenticated image of the user obtained from the ID.

In another implementation, the biometric verification data comprises a verification fingerprint captured using a fingerprint scanner of the computing device and the authenticated biometric data comprises an authenticated fingerprint of the user previously obtained from the ID. In this case, mechanisms such as fingerprint matching can be used to determine whether the biometric verification data (i.e. the verification fingerprint) corresponds to (i.e. matches the fingerprint of) the user, through a comparison with the authenticated fingerprint of the user obtained from the ID.

As already noted, the attribute associated with the user may be an age of the user. Other attributes that may be verified will be apparent to the skilled reader, and include the user's name, date of birth, gender, nationality, address, entitlement to enter a venue, drive a particular vehicle or operate machinery etc.

As noted above, the disclosed verification mechanism occurs locally. That is, no connection to a server or network is required. Accordingly, the attribute associated with the user may be verified without requiring transmission of personally identifiable information, PII, from the computing device. This stands in contrast to existing systems where PII is transmitted to and from a central server to enable verification of user attributes.

Verifying the attribute associated with the user may comprise accessing a certificate stored locally on the computing device, said certificate comprising the attribute information associated with the user. Such a certificate is typically of a standard format, for example as determined by an attribute verification software provider, and thereby presents a reliable and reproducible representation of the user attribute information which allows for greater interoperability between software applications, which can all be programmed to use (i.e. read and write) the same format of certificate. Preferably, the authenticated biometric data of the user is also stored or embedded in the same certificate, such that software applications running on the computing device can access both the attribute information and the authenticated biometric data at the same memory location. Preferably the certificate is encrypted, to improve security and data privacy. For example, only certain authorised software applications running on the computing device may have the appropriate permissions to decrypt the certificate and access the data stored or embedded therein. This reduces the likelihood of the attribute information or authenticated biometric data being hacked or accessed by unauthorised parties.

The steps performed by the computing device may further include providing a confirmation of the verified attribute associated with the user. Providing the confirmation may comprise presenting the confirmation on a display of the computing device. The confirmation may be machine-readable, such that it can be read and the attribute can be verified by a machine interface. In one such example, the confirmation comprises a QR code which can be read by a QR code scanner. By scanning the QR code, a reading or querying device can confirm that the user attribute has been verified by the computing device. Preferably, the QR code is a dynamic QR code, which may redirect a querying device to a particular location such as a URL and/or encode details associated with the attribute verification in a machine-readable manner, preferably in an encrypted form. The dynamic QR code may update periodically. Use of a dynamic QR code may provide improved spoof-protection as described in further detail below.

Providing the confirmation of attribute verification may additionally or alternatively comprise transmitting a message confirming the verified attribute associated with the user. For example, the computing device may transmit a message to another device confirming verification of the attribute.

Alternatively, the message may be transmitted from one software application running on the computing device to another software application running on the computing device. The latter approach in particular may enable checkout-free shopping, whereby verification and confirmation of the user attribute takes place solely on the computing device (e.g. a smartphone of the user) and there is no need for a querying device or checkout.

The steps performed by the computing device may further include: obtaining spatiotemporal information associated with verification of the attribute associated with the user. The steps may further include embedding the obtained spatiotemporal information in the confirmation of the verified attribute. "Spatiotemporal" in this context means relating to a time and/or location at which verification of the attribute associated with the user is taking place.

For example, the spatiotemporal information may comprise information relating to one or more of: a current date; a current time; a current location; and an identity of an establishment where verification of the attribute associated with the user is taking place. "Current" in this context means current at the time of verification, or within a threshold time or distance therefrom. In one example, the confirmation of the verified attribute (e.g. a QR code) includes a date and time stamp confirming the date and time at which verification of the user attribute took place. The confirmation may also include a location, for example the name of an establishment, a GPS location, or the like, associated with where verification of the attribute took place. Embedding such information into the verification confirmation can reduce the possibility of ID spoofing, as described in more detail below. Hence, the verification process is made more secure.

The steps performed by the computing device may further include, prior to capturing the biometric verification data: obtaining, from the ID document, the authenticated biometric data of the user and the attribute information associated with the user; capturing biometric registration data using the computing device; determining whether the biometric registration data corresponds to the user by comparing the biometric registration data with the authenticated biometric data; and in response to determining that the biometric registration data corresponds to the user, storing locally at the computing device:

a) the authenticated biometric data of the user; and b) the attribute information associated with the user.

The above steps may be considered a registration or configuration phase, whereby the computing device is configured or registered for verification of an attribute associated with a user. This registration/configuration phase may precede a subsequent verification phase, during which the user attribute is actually verified.

Obtaining the authenticated biometric data of the user and/or the attribute information associated with the user from the ID may comprise capturing an image of the ID using a camera of the computing device. For example, the computing device may scan or photograph an ID to obtain the authenticated biometric data and attribute information. Such information may, in some examples, be obtained using optical character recognition, OCR.

Additionally or alternatively, obtaining the authenticated biometric data of the user and/or the attribute information associated with the user may comprise interrogating a memory of the ID. In other words, the computing device may communicate with a memory comprised in the ID, whereby that memory stores the authenticated biometric data of the user and/or the attribute information associated with the user. The computing device can obtain this data from the memory.

Preferably, the ID is a document issued by an ID provisioning authority. For example, the ID provisioning authority may be a trusted institution such as a government, government department, passport office, driving standards agency, driving license issuer or any other authority which has been authorised for providing IDs. Limiting the disclosed methods to using specific forms of trusted ID ensures that the data obtained from the ID can be trusted to accurately relate to the owner of the ID.

The ID may be a passport. The memory may be a wireless data transfer chip, such as an NFC chip. In one example, the ID is a passport and the memory is an ePassport NFC chip. ePassport NFC chips represent an existing mechanism whereby authenticated biometric data of a user and attribute information associated with the user (for example relating to the user's name, age, date of birth etc.) are digitally stored on the ePassport NFC chip of a passport. This chip can be read, and the information stored therein can be accessed, for example by the computing device of the present disclosure. The biometric data obtained from the ID, in this example from the ePassport NFC chip, may comprise an image of the user, a fingerprint of the user and/or a close-up of an iris of the user. These biometric data can be used as authenticated biometric data to match biometric data subsequently captured from the user, as described in further detail herein.

Determining whether the biometric verification data and/or the biometric registration data corresponds to the user as disclosed above may comprise performing one or more anti-spoofing procedures. For example, where the biometric verification data comprises a verification image captured by the computing device, the computing device may instruct the user to perform a certain gesture, such as "look left", "look up", "tilt head" etc., while the verification image is being captured. Based on the user's action, liveness tests can be conducted to ensure the image being captured is an image of a real human and not an image of a spoof (for example an image of a still photo). Similar mechanisms can be applied when a registration image is captured by the computing device during a registration phase. Other anti-spoofing procedures which may be used when the biometric data is not an image of the user will be apparent to the skilled person. For example, where the biometric data comprises a fingerprint, liveness anti-spoofing checks may comprise determining whether the finger changes colour when pressure is applied to the fingerprint scanner, or checking for particular landmarks which are commonly not found in spoof fingerprints.

According to another aspect of the present disclosure, there is provided a computer-implemented method of configuring a computing device for verifying an attribute associated with a user. Such a method may be considered to relate to a registration phase or configuration phase, in that it configures (or registers) the computing device to the user to be subsequently used for verification of an attribute associated with that user.

The disclosed method comprises performing, by the computing device, steps including: a) obtaining, from an identity document, ID, authenticated biometric data of the user and attribute information associated with the user; b) capturing biometric registration data using the computing device; c) determining whether the biometric registration data corresponds to the user by comparing the biometric registration data with the authenticated biometric data; and d) in response to determining that the biometric registration data corresponds to the user, storing locally at the computing device:

i) the authenticated biometric data of the user; and ii) the attribute information associated with the user.

By performing this method, the computing device can be configured to perform attribute verification for the user as disclosed above and throughout this disclosure. In particular, the computing device can be configured to perform local attribute verification without need for a centralised server. As above, in an implementation the computing device may comprise a mobile device, for example a mobile device of the user. In that case, the method can also be performed without need for dedicated hardware to be installed at the verification location. As above, the registration and authenticated biometric data may comprise, for example, images of the user or the user's fingerprint, captured by a camera or a fingerprint scanner of the computing device respectively.

Said storing locally at the computing device may comprise embedding the authenticated biometric data of the user and/or the attribute information associated with the user in a certificate and storing the certificate locally at the computing device. As noted above, such a certificate presents a reliable and reproducible representation of the data in question, such that the computing device can access both the attribute information and the authenticated biometric data at a known location. Preferably the certificate is encrypted, to improve security and data privacy. For example, only certain authorised software applications running on the computing device may have the appropriate permissions to decrypt the certificate and access the data stored or embedded therein. This reduces the likelihood of the attribute information or authenticated biometric data being hacked or accessed by unauthorised parties.

The authenticated biometric data of the user and the attribute information associated with the user may be stored such that they are accessible to more than one software application running on the computing device. For example, the authenticated biometric data and attribute information may be embedded in a certificate and this certificate may be stored at a predetermined location in memory on the computing device. The location may be advertised or made accessible to more than one software application running on the computing device, such that more than one application can utilise the same data (e.g. certificate). This can enable subsequent applications which make use of the stored data to be configured and setup for attribute verification without the need to obtain any further data from an ID, as described in further detail below.

In one example, steps a)-d) above are performed by a first software application running on the computing device, and the method subsequently further comprises: e) accessing, by a second software application running on the computing device, the authenticated biometric data of the user and the attribute information associated with the user stored locally at the computing device. The method may further comprise: f) configuring the second software application to enable verification of the attribute associated with the user, by the second software application. The method may further comprise: g) verifying, by the second software application, the attribute associated with the user.

In this way, the second software application can be configured to enable attribute verification in the same manner as the first software application, but configuration of the second software application does not require access to the ID. This is beneficial because it means new applications can be setup for attribute verification more quickly and in the absence of the ID.

According to another aspect of the present disclosure, there is provided a computing device configured to perform any of the methods or processes disclosed herein. For example, the computing device may comprise a processor and memory. The memory may store instructions which, when executed by the processor, cause the processor to carry out one or more of the steps or processes disclosed herein. The computing device may be a mobile device, for example belonging to a user being verified.

According to another aspect of the present disclosure, there is provided a computer-readable medium comprising instructions which, when executed by a processor of a computing device, cause the computing device to perform any of the methods or processes disclosed herein. The computing device may be a mobile device, for example belonging to a user being verified.

According to another aspect of the present disclosure, there is provided a computer program comprising instructions which, when the program is executed by a computing device, cause the computing device to perform any of the methods or processes disclosed herein. The computing device may be a mobile device, for example belonging to a user being verified.

According to another aspect of the present disclosure, there is provided a system comprising: a computing device configured to perform any of the methods or processes disclosed herein for verification of an attribute associated with a user; and a querying device configured to receive confirmation of the verified attribute associated with the user from the computing device. The computing device may comprise a mobile device, for example belonging to the user being verified.

According to another aspect of the present disclosure, there is provided a system comprising: a computer program comprising instructions which, when the program is executed by a computing device, cause the computing device to perform any of the methods or processes disclosed herein; and a computer program comprising instructions which, when the program is executed by a querying device, configure the querying device to receive confirmation of the verified attribute associated with the user from the computing device. The computing device may comprise a mobile device, for example belonging to the user being verified.

The querying device may be a point of sale, POS, device, for example provided at a checkout in a store. In some examples, the querying device may comprise a self-checkout machine.

Receiving confirmation of the verified attribute associated with the user from the computing device may comprise scanning, by the querying device, a display of the computing device.

BRIEF DESCRIPTION OF THE FIGURES

Illustrative implementations of the present disclosure will now be described, by way of example only, with reference to the drawings. In the drawings:

FIG. 2 is a schematic representation of an alternative attribute verification system according to the present disclosure;

FIG. 7 is a flow diagram of the steps involved in an example use case of the verification mechanisms of the present disclosure.

Throughout the description and the drawings, like reference numerals refer to like features.

DETAILED DESCRIPTION

Figure 1:
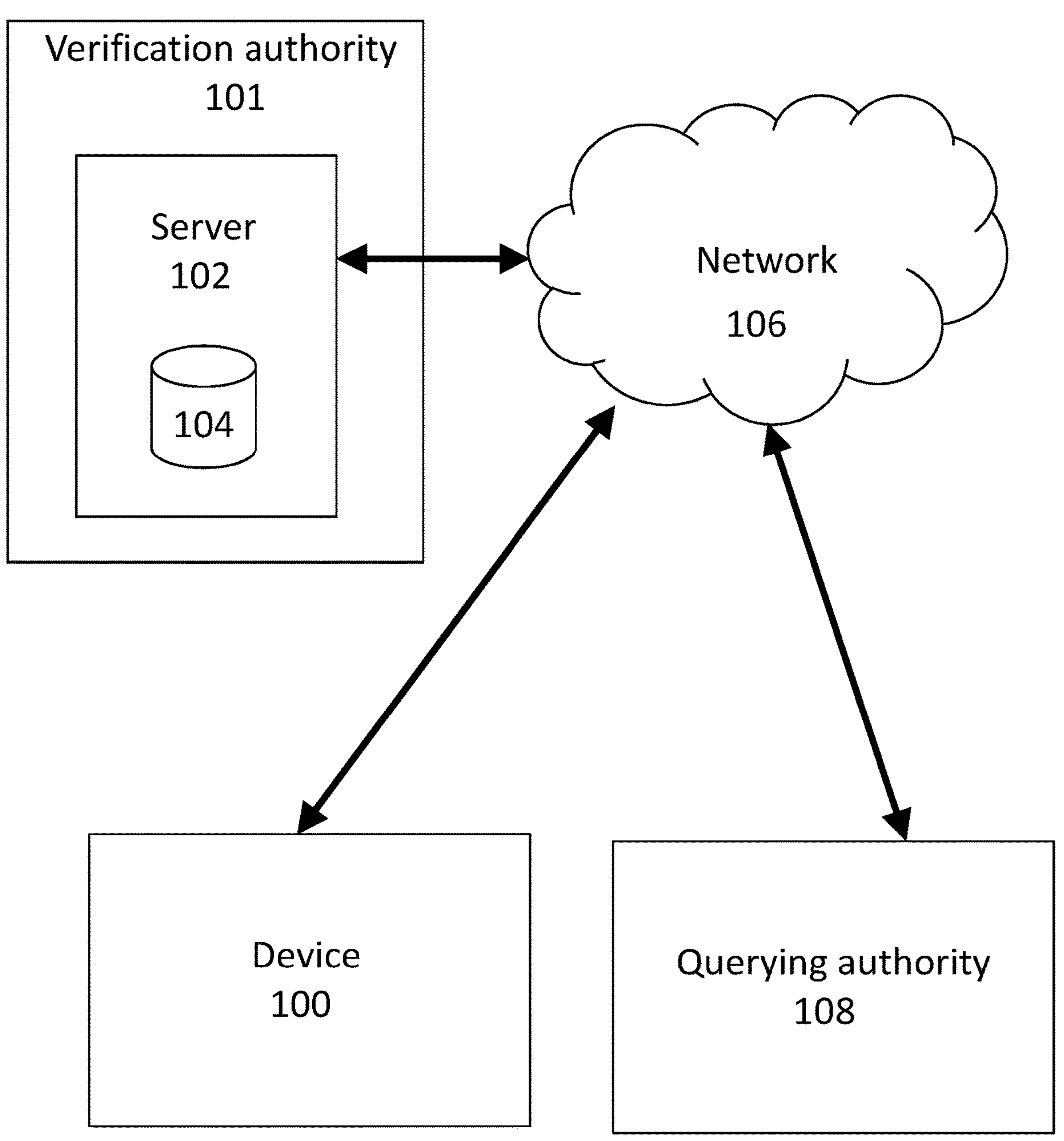
FIG. 1 is a schematic representation of an existing prior art system for attribute verification.

This detailed description describes, with reference to FIG. 1, an existing prior art system for attribute verification. An alternative, improved attribute verification system which overcomes various technical drawbacks of the prior art system is then described with reference to FIGS. 2-7. Finally, a computing device which may be used to perform the methods of the present disclosure is described with reference to FIG. 8.

The methods and systems disclosed herein relate generally to verification of user attributes, such as age or identity. The presently disclosed processes and mechanisms enable such verification to be conducted locally using a computing device. No data needs to be exchanged with a central authority or database, in contrast to existing mechanisms. Accordingly, technical drawbacks associated with prior art systems are addressed.

In one implementation, the disclosed methods may be performed by a querying device, for example located in a store or at a barrier or entry to a venue. The querying device may perform the disclosed methods to verify a user wishing to, for example, purchase a restricted item in the store or gain access to the venue. In an alternative implementation, the disclosed methods are performed by a mobile device, typically belonging to or associated with the person being verified. In this case, the disclosed methods provide an additional advantage in that there is no need for any dedicated verification hardware to be installed at the point of verification. Instead, the user simply uses their own device.

The benefits of the presently disclosed systems and methods will be more readily apparent when viewed in the context of existing systems for digital attribute verification. Accordingly, an example of such a system will be described briefly in relation to FIG. 1.

Turning to FIG. 1, a server 102 associated with an attribute verification authority 101 is shown. This centralised authority 101 stores user profiles, for example in a database 104, to enable it to provide attribute verification functionality. For example, database 104 may store a list of attributes associated with each user on the system, such as their age, date of birth, name, gender etc.

When a new user wishes to register with the service, the user communicates with the central authority's server(s) and database(s) via a network 106, typically the internet, via user device 100. For example, the user may transmit a registration request alongside some form of personally identifiable information, PII, which the server 102 can then associate with the user and store in database 104.

Subsequently, the user may be required to verify an attribute such as their age, for example when purchasing a particular good at a store. At this point, either the user or a querying authority, such as the store at which the good is being purchased, communicates with the attribute verification authority 101 via network 106 to obtain the necessary verification data for the user. For example, the device 100 of the user or the querying authority 108 may transmit some PII (for example a name or address) of the user to the verification authority 101. On receipt of this, the server 102 may match that PII to one of the user profiles it holds in database 104 and respond to the user device 100 and/or querying authority 108 with a confirmation of the user's age, thereby verifying that attribute of the user.

As will be readily appreciated from the above and from FIG. 1, such a prior art system involves constant communication between users and/or querying authorities and the central attribute verification authority 101. This two-way communication is shown schematically in FIG. 1 by double-ended arrows.

A significant technical drawback of such a prior art system is that it is entirely reliant on the user device 100 and/or querying authority 108 having a connection to network 106 and, thereby, to the centralised attribute verification authority 101. This presents a problem, because the system may be unsuitable for use in areas where network connection is unreliable or even non-existent. This may be the case in remote locations but can also occur in crowded areas, such as sports stadiums or concert venues, where networks can become overloaded by the number of devices attempting to connect to the same network cell. In such an environment, the prior art system of FIG. 1 would fail and be unable to provide attribute verification to the user. Where attribute verification is an essential step in, for example, a transaction, then it would consequently not be possible for the user to complete that transaction. Similarly, a person may not be able to gain entry to a venue or building if they are unable to verify their identity.

A further drawback of the system shown in FIG. 1 is the fact that the centralised verification authority 101 must hold sensitive attribute data for many users. This presents a single attack surface through which a hacker or malicious entity could access untold volumes of personal user data. Further, as described above, PII such as a user's name, date of birth, or address must be transmitted over the network 106 as part of the registration or verification process. This presents yet a further opportunity for data hacking or loss.

The disclosed systems and methods, which will now be described in detail, provide an alternative mechanism for attribute verification which addresses the above-described technical limitations of existing systems. It should be noted that the technical limitations of the above system apply irrespective of the type of user attribute being verified; that is, they are systematic technical limitations resulting from technological shortcomings of the prior art system. It is these technical limitations which the disclosed systems and methods seek to address.

At a high level, the disclosed system enables attribute verification to be performed locally at a computing device, such as a querying device at a store or venue or on the user's own mobile device. This means there is no need to rely on any central verification authority 101, in contrast with prior art systems. The process by which this is enabled is shown schematically in FIG. 2 and is then described in further detail in FIGS. 3 and 4.

Figure 2:
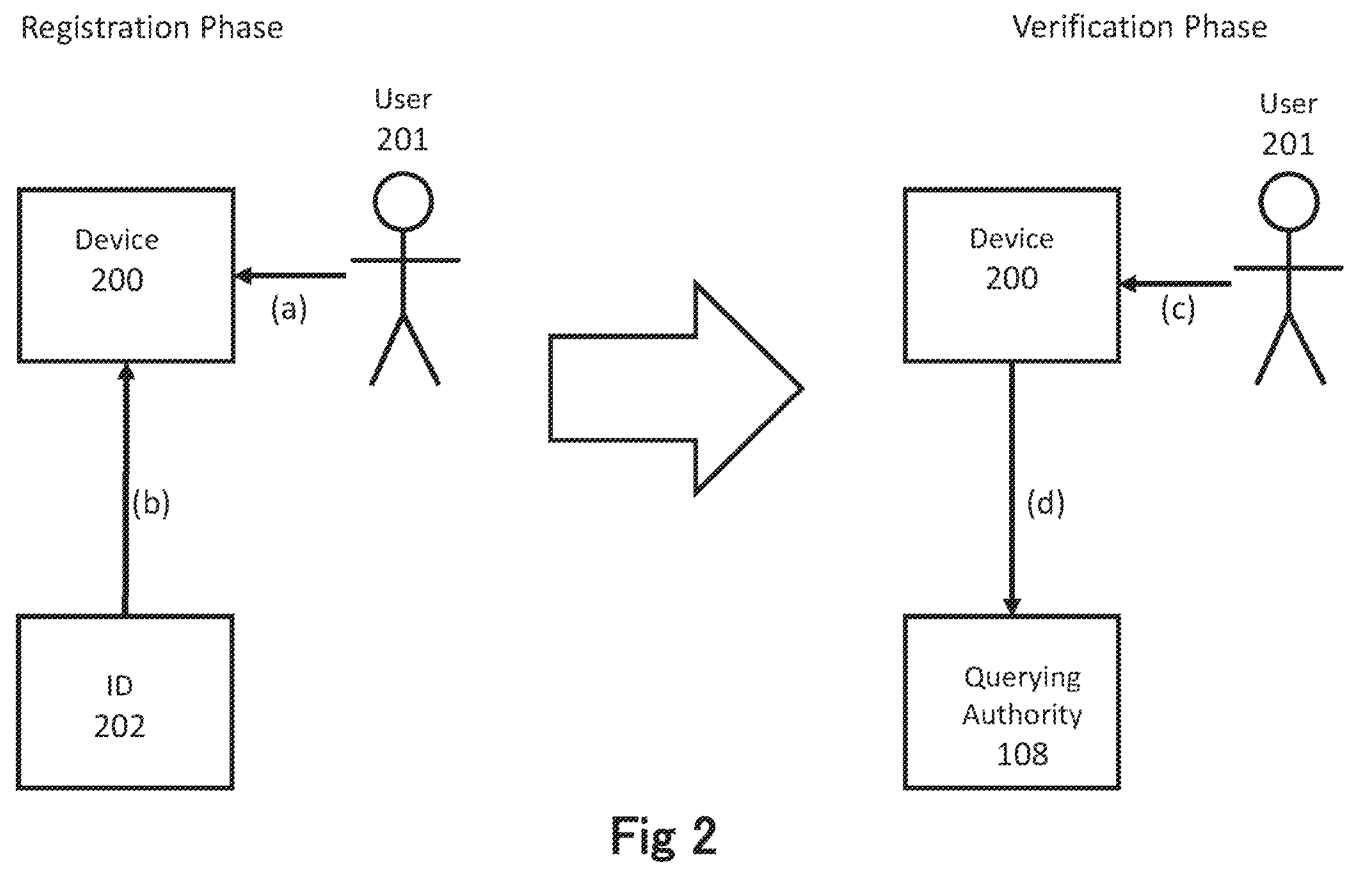

Turning first to FIG. 2, as shown the disclosed attribute verification process can be thought of as comprising two separate phases. A first phase, which may be considered a registration phase, configures the computing device 200 for use in the attribute verification procedure. Note that the terms "registration phase" and "configuration phase" are therefore used interchangeably throughout this disclosure. Following registration, during a subsequent verification phase, the computing device 200 is then used to verify an attribute of the user 201, such as their age.

As noted above, computing device 200 may be stationary or mobile. In some implementations, the computing device is a terminal, machine, scanner or computer provided at a verification venue. For example, computing device 200 may be part of an entry barrier at a building, or part of a checkout machine in a store. In other implementations, the computing device may be a mobile device, for example a mobile computing device including but not limited to a mobile phone, smartphone, personal digital assistant (PDA), laptop, tablet, and other "smart" mobile device, such as a smartwatch. The processes performed by the computing device 200 during the registration phase can be controlled by software running on the device. For example, where the computing device 200 is a mobile device, the process can be controlled through a software application or "app" running on the mobile device.

The registration phase will be described in further detail in relation to FIG. 3 below. In brief, however, the registration phase involves the computing device 200 capturing biometric data of the user using the computing device 200. This process is represented by arrow (a) in FIG. 2. The captured biometric data may be considered biometric registration data in that it is used to register user 201 with computing device 200 for attribute verification.

The computing device 200 also obtains attribute information and authenticated biometric data of the user from an ID 202. This process is represented by arrow (b) in FIG. 2. The authenticated biometric data represents or comprises biometric data as stored or comprised in the user's ID 202.

The authenticated biometric data may be any data suitable for biometrically identifying the user 201. For example, the authenticated biometric data may comprise one or more of: an image of the user (e.g. a passport photo or driving license photo); a fingerprint of the user; and an iris detail (e.g. a closeup of an iris) of the user. These biometrics may then subsequently be used to identify the user through, for example, facial recognition, fingerprint matching and/or iris recognition respectively when new biometric data is received for the user during registration or verification.

For example, where ID 202 is a passport, the authenticated biometric data comprises the passport photo, fingerprint and iris detail of user 201. As a result of its originating in a passport, this biometric data can be considered to be authoritative or approved such that it accurately represents the user 201. Similarly, because the attribute information is also obtained from the ID 202 it can similarly be presumed to be accurate. The attribute information can relate to any attribute of the user 201 which is attested to by the data on the ID 202, such as the user's name, date of birth, age, gender, address, nationality etc.

Preferably, the disclosed methods are limited to using ID documents issued by a trusted or authorised ID provisioning authority. For example, the ID provisioning authority may be a government, government department, passport office, driving standards agency, driving license issuer or any other authority which has been verified for providing IDs. In that case, the computing device 200 may have access to a list of authorised ID provisioning authorities and may only accept the use of an ID issued by one of said authorities. The list of authorised ID provisioning authorities may be included as part of the software application(s) performing attribute verification on computing device 200, for example as part of SDK provided by an attribute verification software provider.

Once the authenticated biometric data of the user 201 has been obtained from the ID 202 and the biometric registration data has been captured, these data can then be compared. If the computing device 200 determines, based on this comparison, that the biometric registration data and authenticated biometric data do not correspond to the same person, then the registration process fails. The user 201 may be given an opportunity to retry the process. This check prevents a user from registering with someone else's ID 202.

If, however, the computing device 200 determines, based on this comparison, that the biometric registration data and authenticated biometric data do correspond to the same person, i.e. both correspond to the user 201, then the registration process can be completed and the computing device 200 can be configured to verify one or more attributes of the user 201 in future.

In particular, if the biometric registration data is determined to correspond to the user 201, the computing device 200 can store locally at the computing device: i) the authenticated biometric data of the user obtained from ID 202; and ii) the attribute information associated with the user obtained from ID 202. The stored authenticated biometric data and attribute information can then be used subsequently during a verification phase, to verify one or more attributes of the user 201.

Such a verification phase is also shown schematically in FIG. 2. As shown schematically, the verification phase once again involves the computing device 200 obtaining biometric data of the user. In this case, the captured biometric data can be considered biometric verification data in that it is used to enable the computing device to verify a user attribute. This process is represented by arrow (c) in FIG. 2.

The captured biometric verification data can then be compared, by the computing device 200, to the authenticated biometric data of the user previously obtained from the ID 202 and stored at the computing device during the registration phase.

If the computing device 200 determines, based on this comparison, that the biometric verification data does not correspond to the same person as the authenticated biometric data, i.e. does not correspond to user 201, then the verification process fails. The user 201 may be given an opportunity to retry the process. This check prevents a user from using a computing device 200 registered to someone else's ID 202 during attribute verification.

If, however, the computing device 200 determines, based on this comparison, that the biometric verification data does correspond to the same person as the authenticated biometric data, i.e. user 201, then attribute verification can proceed. In particular, the computing device 200 can access the attribute information previously obtained from the ID 202 and stored at the computing device 200 during the registration phase. Based on the attribute information, an attribute associated with the user can be verified. For example, the attribute information may comprise the user's date of birth. Based on this information, once the biometric verification stage has been successfully passed, the computing device 200 can verify or confirm the user's age, or that the user is of a certain minimum age. In another example, the attribute information may comprise the user's name. In that case, once the biometric verification stage has been successfully passed, the computing device 200 can verify or confirm the user's name, or that the user is on a list of certified or approved persons or has certain clearances or privileges.

In some examples, confirmation of the attribute verification can be presented or transmitted by the computing device 200, for example to a querying authority 108. This process is represented by arrow (d) in FIG. 2. In some examples, the querying authority 108 may comprise a querying device, such as a checkout machine in a store, an entry barrier at a venue or other building, an automated vending machine, or a device of a delivery person such as where the disclosed methods are used in the context of home delivery. By receiving or scanning the confirmation, the querying device can confirm that the user is verified for the transaction in question, or for entry to a venue. This facilitates fully automated transaction flows and venue entry.

Through the above-described functionality, an attribute of the user 201 can be verified in an entirely local manner. There is no need for any network connection during the registration or the verification phases. This means attribute verification can be conducted in any location and at any time, regardless of network quality or connectivity. Further, no PII or sensitive data needs to be transmitted from the computing device 200 to a remote network or server at any point, in contrast to the prior art system of FIG. 1. This reduces the possibility of a malicious actor obtaining user data or PII, further improving security. Further, where computing device 200 is a mobile device of the user, there is no need for any single centralised authority to hold sensitive data for multiple persons. Rather, data is held in a distributed manner on users' own personal computing devices. This distributes the attack surfaces available to a malicious actor, and avoids the possibility of a single hack or data loss resulting in, for example, the publicizing of sensitive data of multiple users simultaneously.

As can be seen, the disclosed methods enable a more reliable and more secure mechanism for verifying user attributes such as age and identity. To further assist in the understanding of these mechanisms, the two phases described above (registration and verification) will now be explained in further detail with reference to FIGS. 3 and 4 respectively.

Figure 3:
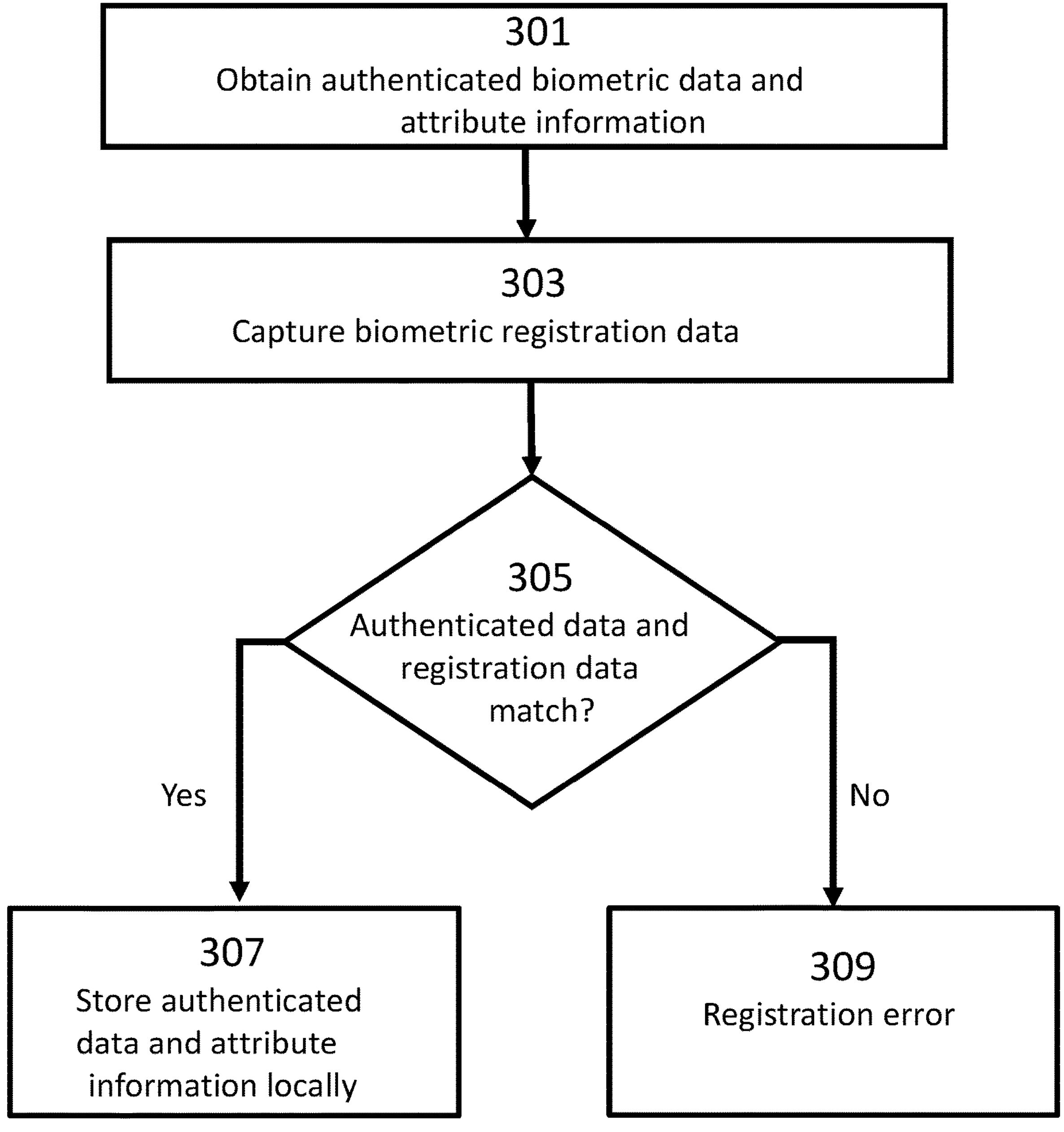
FIG. 3 is a flow diagram of the steps involved in an implementation of the registration phase of the present disclosure.

Turning first to FIG. 3, an example of the registration or configuration phase described above and shown in FIG. 2 is shown in more detail. In particular, the various steps performed by computing device 200 during the registration phase are shown. As noted above, this process is typically performed under control of software running on the computing device 200 and which instructs the processor of the computing device 200 to perform the recited steps. Where computing device 200 is a mobile device such as a smartphone, said software typically comprises a software application or "app" running on the mobile device 200.

In one example, the process begins or is initiated when the software or software application receives a request from the user 201, for example via an input to a screen of the computing device 200, to begin registration. In response, the process of FIG. 3 starts and the computing device 200 obtains, at block 301, authenticated biometric data of the user and attribute information associated with the user from the ID 202.

In one example, the authenticated biometric data and attribute information are obtained using a camera of the computing device 200. For example, an image of the ID 202 can be captured. Optical character recognition (OCR) may then be used to extract the attribute information from the ID 202. An image of the user included in the ID 202 can be similarly scanned or photographed and extracted as the authenticated biometric data, i.e. as an authenticated image of the user 201.

In another example, some or all of the authenticated biometric data and/or attribute information are obtained by interrogating a memory of the ID 202. For example, the ID 202 may comprise a wireless data transfer chip, such as an NFC chip. The memory may be of the known ePassport NFC chip type. The computing device can communicate with or read from this memory to obtain the authenticated biometric data of the user and/or the attribute information associated with the user. The memory may be protected, for example by a password. In that case, the computing device 202 may obtain the password to enable communication with the memory. In one example, the password is obtained by capturing and performing OCR on characters or text displayed on the ID 202 and determining a password based on those characters or text.

In some examples, and as mentioned above, the type of ID that can be used during registration can be limited to certain document formats or types. This may in effect limit the types of IDs that can be used to certain specific authoritative documents issued by a predetermined subset of authorised institution(s) or government(s). This may improve the degree of trust which can be assigned to the authorised biometric data and attribute information obtained from the ID 202. Non-limiting examples of IDs may include passports, driving licenses, national identity cards, healthcare cards, biometric permits such as residency permits and the like. More generally, as discussed above, the disclosed methods may be limited to using IDs issued by an authorised ID provisioning authority, such as a government, passport office, driving standards agency or driving license issuer. An authorised ID provisioning authority may be one which is authorised by the attribute verification software provider which has provided the attribute verification software running on computing device 200. Said attribute verification software provider may in that case include a list of authorised ID types and/or authorised ID provisioning authorities as part of the attribute verification software, for example embedded in SDK.

Next, at block 303, the computing device 200 captures biometric registration data. In some implementations, the biometric registration data comprises an image of the user, i.e. a registration image. Where the computing device 200 is a terminal, the user may be instructed to stand in front of the terminal such that they are in a field of view of the terminal's camera. Alternatively, where the computing device 200 is a mobile device of the user, such as a smartphone, the registration image may be a "selfie", in other words an image of the user taken with the front camera of the mobile device. Other methods for obtaining a registration image using a camera of the computing device 200 will be apparent to a skilled reader and will depend on the nature of the computing device 200 and the position of its camera. In other examples, the biometric registration data comprises a fingerprint of the user, or a closeup of an iris of the user. These can be obtained in any suitable manner, such as via a fingerprint scanner or camera of the computing device 200.

In some implementations, anti-spoofing procedures may be carried out when the biometric registration data is captured at block 303. Typically, the anti-spoofing procedures will include some form of liveness check to establish that the biometric registration data being captured is from a genuine human rather than of a spoof. In one example, the biometric registration data comprises a captured image and the computing device 200 may instruct the user 201 to perform one or more gestures, such as "look left", "look right", "turn head left" etc. The computing device 200 can then determine whether the instructed gestures have been performed by the person in the field of view of the camera. If the gesture(s) are followed, the computing device 200 can capture the registration image or use a frame captured during the anti-spoofing procedure as the registration image. If the gestures are not followed, the registration image can be rejected. Where the biometric registration data comprises a fingerprint or iris, other suitable anti-spoofing or liveness tests may be performed. Anti-spoofing procedures of this sort prevent the user 201 from spoofing their biometric registration data, for example by holding up a photograph or similar spoof to the camera during registration, or by using a mould or fake finger during fingerprint verification. Other examples of liveness checks and anti-spoofing mechanisms which could be employed as part of the disclosed methods will be apparent to the skilled reader.

Once the biometric registration data has been captured, the method proceeds, at block 305, to determine whether the biometric registration data corresponds to the same person as the ID 202. Specifically, the biometric registration data is compared with the authenticated biometric data obtained, at block 301, from the ID 202 to determine whether they match, i.e. correspond to the same person. The exact comparison mechanism(s) by which the determination of block 305 is made are beyond the scope of this disclosure and will be apparent to a skilled reader. In the case of a registration image, typically some form of facial recognition procedure will be performed on both the registration and authenticated images to determine whether the facial features in each image are sufficiently similar. For example, the computing device 200 may use facial landmarking analysis to determine whether there is less than a predetermined threshold of difference in relative position between certain key facial landmarks in each of the authenticated image and the registration image. In another example, a method known as FaceNet may be used, which extracts high-quality features from the face and predicts a 128 element vector representation of these features, called a face embedding, to determine a match. In some examples, iris recognition may be used and an iris in the registration image is compared with an iris in the authenticated image. Where fingerprints are used, the registration fingerprint obtained at block 303 is compared with the authenticated fingerprint obtained at block 301 through an appropriate fingerprint analysis mechanism. Other mechanisms for comparing the biometric data for similarity will be apparent to a skilled reader and may be used as part of the disclosed methods.

If the biometric registration data is determined not to correspond to the same person as the authenticated biometric data, then registration fails and a registration error is recorded or displayed at block 309. The user may be prompted to retry the registration process. This check prevents a person from registering themselves with somebody else's ID.

On the other hand, if the comparison performed at block 305 passes, in other words if the authenticated biometric data and the biometric registration data are determined to correspond to the same person, then the method proceeds to block 307. At this stage, the authenticated biometric data and the attribute information obtained, at block 301, from the ID 202 are stored locally at the computing device 200. In a preferred embodiment, the authenticated biometric data and attribute information are embedded in a certificate which is stored locally in memory of the computing device 200. The certificate is preferably encrypted to improve data security.

In some implementations, the computing device 200 simply obtains the attribute information from the ID 202 and stores it as-is, once the biometric check has been passed. In other implementations, however, the computing device 200 computes some further attribute information for the user 201 based on the attribute information obtained from the ID 202. For example, the user's date of birth may be obtained from the ID 202. From this, the computing device 200 may determine the user's age or that the user meets some predetermined criteria, for example "user is over 18" or "user is over 21". In some examples, if the process determines at this stage that the user does not meet a minimum age criteria, then the registration process ends regardless of whether the biometric check is passed at block 305. The user is preferably informed that they do not meet the minimum registration requirements and, preferably, all data obtained so far by the computing device 200 is deleted.

Where a determination about the user's age is made by the computing device 200 based on information obtained from the ID 202, a current date can be used for the age calculation. Preferably, the current date is obtained from a trusted source such as a data carrier or mobile phone network to which the computing device 200 has access, rather than the local date at the computing device 200. This prevents the user modifying the local date at the computing device 200 and spoofing their age by confounding the age calculation performed by the computing device 200. Note that whilst this approach requires some very limited contact with a network or carrier, the only information that needs to be obtained is a current date (and, optionally, time). This is extremely simple and requires no data-heavy transmissions between the computing device 200 and the network, in contrast to the prior art system of FIG. 1. In particular, a basic telephone network connection is sufficient and no internet connection is required. Once the date has been established by the computing device, no further communication with the network is necessary.

Preferably, the authenticated biometric data and attribute information are stored in a location and manner on computing device 200 such that other software applications which perform similar attribute verification processes can access them in future. This means that registration and verification can be performed by different software applications, improving the versatility of the system as a whole. This is particularly useful when computing device 200 is a mobile device of the user, on which there may be multiple age verification applications associated with different vendors and/or venues. In this case, if a subsequent second software application is able to access the stored authenticated biometric data and attribute information stored by a first software application, then there is no need for the user 201 to use ID 202 during configuration of the second software application. This significantly speeds up registration with subsequent software applications for attribute verification because, by using the above-disclosed method, the user only needs to substantively register using their ID 202 once. All subsequently used applications can access the locally stored authenticated biometric data and attribute information without the user needing to re-register in full or present ID 202 to the computing device 200. A process for enabling such functionality is described in more detail below with reference to FIG. 6.

The authenticated biometric data and attribute information are, in some examples, stored at block 307 using an SDK provided by an attribute verification software provider. In this case, certain security measures such as encryption can be provided to secure the data in question. Subsequently, in some implementations only applications which are running the same SDK or are provided by the same attribute verification software provider are able to access the stored authenticated biometric data and attribute information. For example, the authenticated biometric data and attribute information may be encrypted, optionally as part of a certificate, and an encryption key to allow decryption of the stored data may be embedded in the SDK. Other applications can then only access the stored data if they have access to the key, which can be limited to those software applications that are running the same SDK or are given access to the key by the attribute verification software provider. In this way, the above-described functionality allowing interoperability between software applications can be provided without compromising the security of the stored data, because only certain authorised software applications can access the stored data.

In some examples, the stored data can additionally or alternatively be associated with, or encrypted using, a device chip ID or other unique ID of the computing device 200 on which registration is performed. This prevents the stored data (i.e. the authenticated biometric data and attribute information) from being transferrable or useable for attribute verification on a different user device, further improving security and reducing the possibility for identity spoofing.

Through the registration procedure of FIG. 3, a user 201 can register themselves to a computing device 200 and configure that computing device 200 to perform attribute verification in future. The mechanism by which such subsequent attribute verification takes place will now be discussed in further detail in relation to FIG. 4.

Figure 4:
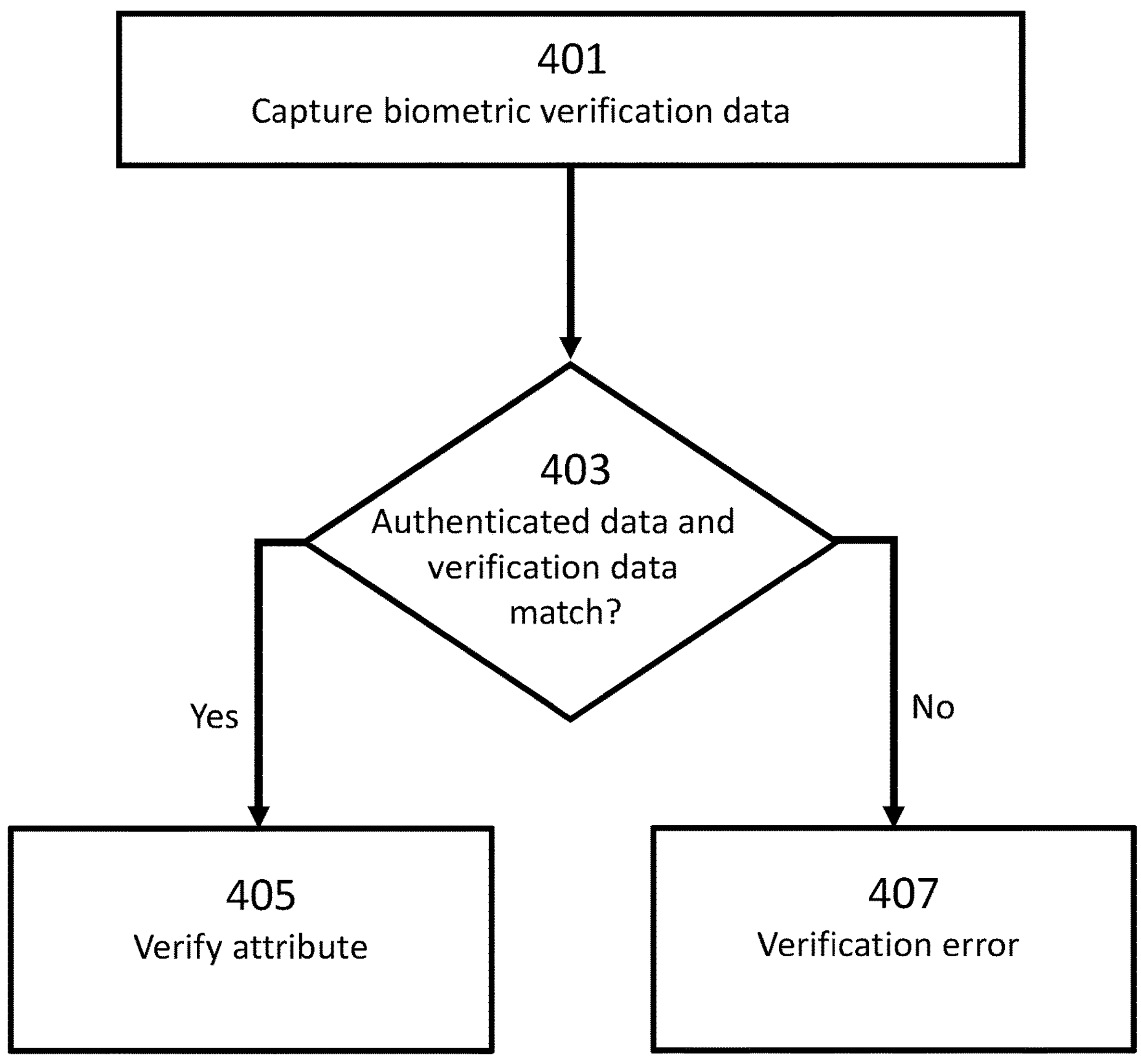
FIG. 4 is a flow diagram of the steps involved in an implementation of the verification phase of the present disclosure.

Turning to FIG. 4, an example of the verification phase described above and shown in FIG. 2 is shown in more detail. In particular, the various steps performed by computing device 200 during the verification phase in order to perform attribute verification for user 201 are shown. As in the case of the registration phase, the process associated with the verification phase is typically performed under control of software running on the computing device 200 and which instructs the processor of the computing device 200 to perform the recited steps. The software may be provided in the form of an "app" as described above. The software responsible for performing the verification process of FIG. 4 may be the same or different software as that which conducts the registration process of FIG. 3. The only requirement is that the software performing the process of FIG. 4 has or is able to gain access to the authenticated biometric data and attribute information stored locally at the computing device 200 during the process of FIG. 3.

In one example, the verification process begins or is initiated when the software receives a request from the user 201, for example via an input to a screen of the computing device 200, to begin attribute verification. Alternatively, particularly where computing device 200 is a mobile device, computing device 200 may receive a request from a device such as a local querying device, for example a checkout machine at a store, a vending machine, or a querying device carried by, for example, a delivery person. In response, the process of FIG. 4 starts and the computing device 200 captures, at block 401, biometric verification data using the computing device 200. The same considerations discussed above in relation to capturing the biometric registration data of FIG. 3 apply here to capturing the biometric verification data. In particular, the biometric verification data may be an image captured by a camera of the computing device 200, a fingerprint captured by a fingerprint scanner of the computing device 200, or any other suitable biometric data which enables biometric identification. In the case of an image, the verification image may represent the field of view a stationary terminal or device, or may be a "selfie" captured by a front camera of a mobile device of the user. Anti-spoofing mechanisms may be employed to prevent spoofing of the biometric verification data as described above in respect of the biometric registration data.

At block 403, the computing device 200 determines whether the biometric verification data corresponds to the same person as the ID 202, i.e. whether the biometric data match. Specifically, the biometric verification data is compared with the authenticated biometric data obtained, at block 301 of the registration phase, from the ID 202. As in the case of the registration phase, the exact comparison mechanism(s) by which the determination of block 403 is made are beyond the scope of this disclosure, and the same considerations discussed above in relation to block 305 apply to block 403. In other words, any suitable form of facial recognition, fingerprint analysis, iris analysis or similar can be performed to determine whether the biometric data match.

If the biometric verification data is determined not to correspond to the same person as the authenticated biometric data, then verification fails and a verification error 407 is recorded or displayed. The user may be prompted to retry the verification process. This prevents someone from using a computing device for attribute verification where the computing device has been configured using someone else's ID 202.

On the other hand, if the comparison performed at block 403 passes, in other words if the authenticated biometric data and the biometric verification data are determined to correspond to the same person, then the method proceeds to block 405. At this stage, one or more attributes associated with the user are verified by the computing device 200 based on the attribute information associated with the user which was obtained from ID 202 and stored locally on the computing device during block 307 of the registration phase.

In an example, block 405 involves accessing age-related attribute information obtained during registration from ID 202 and stored locally at computing device 200. For example, the attribute information may comprise the user's date of birth. From this, computing device 200 may determine the user's age or that the user is over a minimum age, such as 18 years old. In another example, block 405 involves accessing identity-related attribute information obtained during registration from ID 202 and stored locally at computing device 200. For example, computing device 200 may confirm the user's name based on the stored attribute information.

As can be seen, the verification process of FIG. 4 can be performed entirely locally, in the sense that no connection between computing device 200 and any remote network or server is required for the attribute verification to take place. This is in contrast to the prior art system described with reference to FIG. 1 above. Also in contrast to that system, the method of FIG. 4 does not require transmission of any PII from the computing device 200.

In response to verifying an attribute of the user 201 at block 405, computing device 200 may take further action. For example, where computing device 200 is part of an entry barrier to a venue or building, on verifying the user's name and confirming that they are on a list of authorised persons, the computing device 200 may allow the person to access the venue or building. In another implementation, having verified one or more user attributes at block 405, the computing device 200 proceeds to provide a confirmation of the verified attribute(s) associated with the user on a display of the computing device 200. The computing device may alternatively or additionally transmit a message confirming the verified attribute(s) associated with the user, for example to a remote device or network and/or to another software application running on computing device 200. The confirmation may additionally or alternatively take other forms, for example the confirmation may comprise an audio confirmation such as a confirmation tone or audio message.

Where a confirmation of verification is provided on the display of computing device 200, the confirmation may comprise human-readable and/or machine-readable elements. For example, the user's precise age may be displayed, e.g. "35 years old". Alternatively, the display may indicate that the user is of a certain minimum age, e.g. "over 18". In another implementation, a graphic may accompany or replace such a textual indication of attribute verification. For example, a green tick with the word "verified" may be displayed. Any number of mechanisms for confirming attribute verification on the display of the computing device in this manner will be apparent to the skilled person. Where the confirmation includes a machine-readable element, this may be in the form of a QR code in which the attribute verification is embedded. For example, the QR code may, when read by a suitable QR code reader, confirm the user's age to that reader or confirm that the user is over a required minimum age, such as 18. Providing such a visual confirmation of the attribute verification on a display of computing device 200 may be particularly useful where computing device 200 is a mobile device of the user 201, because then the user 201 can present their mobile device to a store or venue attendant, machine interface (such as a QR code scanner) at the store or venue, or any other querying authority or device such as a delivery person or vending machine. Presenting confirmation of verification in this manner can then facilitate completion of a transaction or entry to a venue, for example.

In one implementation the QR code displayed on the computing device 200 to confirm verification is a dynamic QR code which may redirect a querying device (QR scanner) to a particular location such as a URL or present certain recently obtained spatiotemporal data to the querying device. The dynamic QR code may update periodically. Use of such a dynamic QR code may provide improved spoof-protection as described in further detail below.

In an example, the verification procedure of FIG. 4 may include obtaining spatiotemporal information associated with verification of the attribute associated with the user. This obtained spatiotemporal information can then be embedded in the confirmation of the verified attribute, such as in a dynamic QR code displayed by the computing device 200 after verification. The spatiotemporal information provides some indication of when and/or where the attribute verification has taken place and may again be particularly useful where computing device 200 is a mobile device of the user and where the user is required to present the verification confirmation as part of a transaction or venue entry procedure. Typically, the spatiotemporal information includes one or more of a current date, a current time, a current location, and an identity of an establishment where the verification has taken place or is taking place.

In one implementation, computing device 200 is a mobile device of the user 201 and the above-referenced spatiotemporal information is obtained during the verification process by way of the user scanning, using the camera of their mobile device 200, a QR code or similar visual indicator provided at the location where verification is taking place. For example, if the verification relates to age verification in a store, the user may scan a QR code provided on a checkout machine at the store. In some implementations, the user may alternatively scan a memory, such as an NFC chip or similar element, to obtain the spatiotemporal information. The obtained spatiotemporal information in this example may also indicate the location and name of the store. This obtained location information can then be combined with, for example, the current date and time as provided by a local clock of the mobile device 200, a mobile network or, preferably, by the QR code being scanned.

The combined spatiotemporal information can then be embedded within the confirmation of verification displayed at the mobile device 200. Hence, when the confirmation of verification is presented to and read by an attendant or scanner (if machine-readable) at the store or venue, the confirmation will confirm not only that the user's attribute has been verified but also the date, time and identity of the store or venue where verification took place. This provides an added layer of security to the verification process, because it means that it will be immediately apparent if the user is attempting to present a screenshot or image of an earlier verification confirmation on the mobile device 200. In such a case, the time and/or location data embedded in the confirmation will not match an expected time and/or location, such that the confirmation can be rejected. In a preferred implementation, the confirmation (for example the QR code) provided on the display of the mobile device 200 upon attribute verification is time-limited, in the sense that it automatically expires or refreshes periodically. This further prevents spoofing of the verification process because old verification confirmations cannot be re-used.

Figure 5:
FIG. 5 is an example of a confirmation of verification which may be displayed upon successful attribute verification.

An example of a confirmation of verification which may be displayed on the computing device 200 after attribute verification has succeeded at block 405 is shown in FIG. 5. In this example, computing device 200 is a mobile device 500 of the user, on which is displayed a visual confirmation of attribute verification having been successful. In this example, the attribute being verified is the user's age, specifically that the user is over 18 years old. As can be seen, the confirmation includes both human-readable elements 501 and a machine-readable element 503. Both types of element 501, 503 contain, in this example, spatiotemporal information about where and when attribute verification has taken place. In particular, the human-readable elements contain spatiotemporal information concerning the name and location of the store at which verification has taken place ("X Store", at Oxford Street, London). This information, in an example, can be obtained by reading, using the mobile device 500, a QR code provided at the checkout of the store in the manner described above. The human-readable elements also include a timestamp indicating the time and date at which verification took place (Wednesday, 6$^{th}$ January 2021 at 13:29:43). This time can represent the time at which the process of FIG. 4 completed, or the time at which a QR code or similar element at the store was read. Finally, the human-readable elements include a visual indicator that the user is over 18, in other words that this attribute has been verified. The displayed confirmation also includes a machine-readable QR code 503, which includes all of the above-mentioned information embedded in machine-readable form.

In this manner, the displayed confirmation is able to confirm to both a human (such as a shop attendant) and a machine (such as a QR scanner provided at the checkout or in an automated vending machine) that the user's age has been verified, and that verification took place recently and in the present store. It will be apparent that the querying device or authority may set a threshold time, after which verification confirmations will not be accepted. For example, if the timestamp is more than 30 seconds in the past then the confirmation may not be accepted. Similarly, if the store or location identified is not the store or location in which the customer is present, the confirmation may also be rejected. The software running on computing device 200 may itself time-limit the confirmation, for example after a certain threshold time the confirmation may become void and/or unreadable. Limiting the confirmation in this manner prevents a customer using a confirmation obtained in the past or at a different store by someone else.

Where attribute verification is used to allow user 201 to access a venue or building, the software application performing attribute verification may itself confirm that the user 201 has the required clearances. For example, the software application may contain or have access to a list of persons with clearances. If the user 201 is found, during registration, to match one of the names on the clearance list, an indication of this fact can be stored as part of the attribute information. At verification time, the confirmation of verification can then simply confirm that the user 201 has access permissions. Alternatively, in some examples verification simply confirms the name of the user 201 and a querying device such as an entry barrier then checks the user's verified name against a list of authorised persons.

Figure 6:
FIG. 6 is a flow diagram of the steps involved in an implementation of the present disclosure which enables interoperability between different attribute verification software applications.

Turning now to FIG. 6, an example of a further method according to the present disclosure is set out. As described briefly above, by storing the authenticated biometric data and attribute data obtained from ID 202 in a certain manner, the disclosed verification procedure can be made more versatile and time-efficient by allowing multiple software applications to access the stored information. This can be particularly useful when computing device 200 is a mobile device, such as a smartphone, on which there may be installed multiple software applications for attribute verification. The method of FIG. 6, which can be considered as an extension of the method shown in FIG. 3, allows greater interoperability between such plural software applications.

As noted above, block 307 of FIG. 3 involves storing the authenticated biometric data and attribute information locally on memory of the computing device 200, using a first software application. The method of FIG. 6 then follows on by ensuring, at block 601, that the authenticated biometric data and attribute information stored at block 307 are accessible to more than one software application, in particular that applications other than that which performed the registration process of FIG. 3 can, with the right permissions, access the stored authenticated biometric data and attribute information. As will be appreciated, the functionality of block 601 can be incorporated or subsumed as part of the process of block 307, i.e. these do not need to be separate steps.

At some subsequent time, the method of FIG. 6 then involves, at block 603, accessing by a second software application the authenticated biometric data and attribute information stored at block 307 and made accessible at block 601. Where the authenticated biometric data and attribute information are encrypted or in some way secured, block 603 may involve the second software application being provided with a suitable key or password for decrypting or otherwise accessing the authenticated biometric data and attribute information. As noted above, the authenticated biometric data and attribute information may be stored as a certificate, which may itself be encrypted or password protected. In that case, the second software application is given access to and, if needed, means to decrypt or access the certificate.

Next, at block 605, the second software application is configured for attribute verification. In an example, this involves conducting the registration method of FIG. 3 using the second software application. However, because the second software application already has access to the stored authenticated biometric data and attribute information, use of ID 202 can be omitted when configuring the second software application. This significantly simplifies and speeds up the configuration process, because no ID 202 is required and no data needs to be obtained from it. Finally, at block 607, attribute verification is performed using the second software application. This can involve performing, using the second software application, the method of FIG. 4.

Hence, as can be seen, configuration of the second software application can be expedited by making use of data stored previously by a first software application. The second software application can then be used to perform attribute verification in the same way as the first software application. This is beneficial because different establishments may have their own respective software applications for performing attribute verification within their establishments or stores. The method of FIG. 6 ensures that registration using an ID 202 only needs to be performed once across all such applications. As long as subsequently used software applications are able to access the stored authenticated biometric data and attribute information, then these applications can be configured in a streamlined manner without the need for ID 202 and can each be subsequently used to perform attribute verification. As mentioned above, access to the required information can be ensured by, for example, ensuring that all applications intended for attribute verification include the same SDK which enables them to share and access the relevant stored authenticated biometric data and attribute information.

Turning now to FIG. 7, a detailed use case of the systems and methods of the present disclosure will now be described to further aid understanding. This use case should be understood merely as one example intended to showcase in full how the disclosed systems and methods may be used. Many steps described in relation to FIG. 7 may be omitted in other examples, and additional steps could be added. Hence, the sequence of FIG. 7 should not be construed as being in any way limiting or as identifying essential features.

The example process of FIG. 7 involves a user 201 using their own mobile device 500 to perform attribute verification at subsequent venues in order to verify both their age and identity. The method of FIG. 7 uses image verification, however it will be appreciated that the method could just as well use another form of biometric data, such as fingerprint or iris data, to enable attribute verification.

The process begins at block 701 with the mobile device 500 receiving a request from user 201 to register with a first software application running on the mobile device 500. The first software application is provided by an attribute verification software provider. In response to receiving this request to register, the first software application performs the registration/configuration procedure described above in relation to FIG. 3.

In particular, the first software application prompts the user to obtain the necessary authenticated biometric data from an ID. At block 703, the mobile device obtains the authenticated biometric data, in this example an authenticated image of the user 201, from ID 202. The mobile device also obtains the attribute information from ID 202. In this example ID 202 is a passport having an ePassport NFC chip, and so the authenticated image and attribute information are obtained by the user reading the ePassport NFC chip with an NFC reader of the mobile device 500. Next, the first software application prompts the user to obtain biometric registration data, in this example a registration image. Hence, at block 705, the first software application captures a first registration image of user 201 using the camera of mobile device 500, for example a "selfie" using the front camera of the mobile device 500.

At block 707, the first registration image and authenticated image obtained from the passport 202 are compared. The first software application confirms, through facial landmarking analysis, that both images depict the same person, i.e. user 201. In response to a successful match, the first software application embeds the authenticated image and attribute information obtained from passport 202 in a certificate having a predetermined format and file type set by SDK which the first software application is using. The first software application encrypts the certificate and stores it locally in memory of the mobile device 500 at block 709. In this example, the attribute information obtained from passport 202 includes the date of birth, name, nationality and address of user 201. The first software application calculates, based on the date of birth and a current time obtained from a mobile network provider, that the user 201 is over 18 years of age. Accordingly, a suitable indication of this is also stored as part of the attribute information in the certificate. The first software application then confirms, on a display of mobile device 500, that registration has been completed successfully.

Later, user 201 enters a store and wishes to buy a product which is associated with age restrictions. In particular, the user 201 must verify that they are over 18 years old to purchase the product as part of the transaction flow at a checkout machine. Accordingly, the user 201 opens the first software application and requests age attribute verification. In response, the first software application initiates the verification procedure described above in relation to FIG. 4. In particular, the first software application prompts the user 201 to capture biometric verification data, which in this example comprises a verification image. A first verification image is captured, using the camera of mobile device 500, at block 711.

At block 713, the first software application accesses the certificate previously stored during registration. The first software application has access, through SDK provided with the first software application by the attribute verification software provider, to the necessary password or key to decrypt the certificate. Having accessed the authenticated image embedded in the certificate, the first software applications confirms, through facial landmarking analysis, that the first verification image just captured depicts the same person as the authenticated image, i.e. user 201. In response to a successful match, the first software application accesses the attribute information stored locally in the certificate to verify the age of the user. In particular, the first software application confirms that the attribute information includes an indication that the user is over 18 years of age.

Next, the first software application instructs the user 201 to scan a QR code present at the checkout machine of the store. The QR code provides spatiotemporal information about the current time and location. Once the QR code has been read, the first software application presents, at block 715, confirmation of the user being over 18 on a display of the mobile device 500. The confirmation resembles that shown in FIG. 5 and discussed above. The confirmation includes a visual indicator that the user is over 18, which can be presented to a store attendant. The confirmation also includes the spatiotemporal information obtained from the QR code at the checkout. In particular, the confirmation includes an indication of the current time and date provided by the QR code, as well as the location and brand of the store. This spatiotemporal information and attribute verification confirmation are also embedded in a dynamic QR code presented on the display of the mobile device 500 as part of the confirmation. The store attendant, or in an alternative embodiment, a scanner of a self-checkout machine, scans the QR code on the display of the mobile device to confirm in machine-readable form that the user 201 is over 18 and that the spatiotemporal data matches the expected time and location. On successful confirmation, the transaction completes and the user 201 is able to purchase the restricted product.

Following this, the user wishes to gain entry to a different venue. Access at this venue is restricted to a specific subset of persons, who need to verify their identity using a second software application provided for attribute verification.

Accordingly, user 201 downloads the second software application on mobile device 500. The user then initiates configuration of the second software application for attribute verification, such that the second software application receives a request to register the user 201, at block 717. This triggers the usual registration process described above, this time at the second software application. Importantly, configuration of the second software application does not require the second software application to access any information from the user's passport 202 or any other ID. This is because the second software application also includes SDK provided by the attribute verification software provider. As a result, the second software application is also able to access and decrypt the certificate previously stored in local memory of the mobile device 500 by the first software application. In so doing, the second software application obtains the authenticated biometric data (in this example the authenticated image, i.e. passport photo) and attribute information at block 719. As usual, the second software application then prompts the user to capture biometric registration data, which in this example comprises a registration image. Such a second registration is captured, using the camera of mobile device 500, at block 721. As usual, the second software application then proceeds to confirm that the second registration image and the authenticated image depict the same person, at block 723. In response to a successful match, the second software application confirms, on a display of mobile device 500, that registration has been completed successfully.

The user 201 then arrives at the venue and is asked, either by an attendant or an automated barrier, to verify their name so that this name can be checked against a list of persons with access clearance to the venue. Accordingly, the user 201 opens the second software application and requests name attribute verification. In response, the second software application initiates the verification procedure described above in relation to FIG. 4. In particular, the second software application captures a second verification image, at block 725, and confirms that this image matches the authenticated image at block 727. On a successful match, the second software application displays confirmation of the user's name on the mobile display at block 729, in a similar manner as discussed above. On scanning the confirmation, the entry barrier determines that the user has the required access permissions and permits the user 201 to enter the venue.

As can be seen, the disclosed systems and methods enable simple, secure and reliable user attribute verification. A user is able to make use of one or more software applications on the same computing device and can configure them easily, only needing to provide an ID during the very first registration. This allows for seamless and friction-free interoperability between multiple applications for attribute verification. Various attributes can be verified, such as age and identity. No network connection is required for verification, and no sensitive PII needs to be transmitted to any remote network or server. Incorporation of spatiotemporal information into attribute confirmation and/or the use of anti-spoofing processes during image verification can further ensure that the attribute verification is secure and that the system cannot be easily spoofed, thus providing further technical benefits. These benefits are provided by the disclosed system irrespective of the data being processed, in other words irrespective of which specific attribute is being verified. The disclosed methods and systems thereby address various technical shortcomings of prior art systems.

Variations

The above detailed description describes a variety of exemplary systems and methods for attribute verification. However, the described arrangements and methods are merely exemplary, and it will be appreciated by a person skilled in the art that various modifications can be made without departing from the scope of the appended claims. Some of these modifications will now be briefly described, however this list of modifications is not to be considered as exhaustive, and other modifications will be apparent to a person skilled in the art.

The flow diagrams used in this disclosure, namely at FIGS. 3, 4, 6 and 7 each imply a specific sequence of events, indicated by the arrows leading from one block to the next. However, each of these Figures represents only one example implementation, and in other implementations the sequence of blocks may change. Hence, the sequence shown in FIGS. 3, 4, 6 and 7 should not be interpreted as being the only possible order of steps. On the contrary, to give but a few examples: in some implementations block 303 may precede block 301; in some implementations block 307 may precede block 305 and the data may be deleted if the answer to block 305 is "no"; in some implementations block 603 may precede or trigger block 601; and in some implementations block 605 may precede or subsume block 603 and/or block 601. Unless stated explicitly that a particular step must precede another, it should be assumed that any order of steps is possible.

As noted above, a unique ID of the computing device on which registration is performed may be incorporated into the certificate or stored verification data in some way, to ensure that verification can only subsequently be performed on that computing device. In some examples, the unique ID is obtained from a device chip ID of the computing device, which may be a unique serial number or ID provided to the computing device at manufacture.

As mentioned above, the software application(s) provided on the computing device for attribute verification may include a particular SDK, or subset of SDK assets. The SDK may be provided by an attribute verification software provider to third parties and may be embeddable into third party software applications, for example applications associated with shopping establishments or venues. The SDK may set the minimum age criteria or contain a list of names of certified persons. The SDK may assist the software application in storing and/or encrypting the stored authenticated biometric data and attribute information, for example as a certificate. The SDK may subsequently provide or allow access to a private key for accessing the encrypted data with a different software application which also includes the SDK, or a subset of the SDK assets.

In some examples, pseudonymised or anonymised data may be sent to an attribute verification software provider which provided the verification software application and/or the SDK, to enable anonymous verification data to be collected. This may allow patterns and trends to be identified by the attribute verification software provider which can enable updates or improvements to the software application (s) and/or SDK to be provided. In some examples, the transmitted anonymised data may include spatiotemporal data, for example details of the venue where attribute verification took place, and thereby provide a form of audit record of each individual verification performed by the user. This can assist in fraud prevention by providing a verified and traceable record of transactions. The sending of such anonymised data may be performed after verification, once network connectivity becomes available. For example, the data may be stored in a local buffer on the computing device and then be transmitted at a later time. In some cases, the user may be prompted to choose whether or not to share their data with the attribute verification software provider. In some implementations, the user may also be prompted to confirm whether they permit the venue (e.g. retailer) at which attribute verification has occurred to access certain data about the verification and/or transaction. This information may be obtained by the venue through scanning of a confirmation of verification displayed on the computing device.

Verification may be part of a fully or partially automated process. In some examples where the computing device performing verification is a mobile device of a user, a querying device (which may function autonomously or under the operation of the or another user) may have its own companion application provided by the same attribute verification software provider as the verification application on the user's mobile device and/or containing some or all of the same SDK. This can enable this companion application to interface with and interrogate the software application on the user's device.

In one example, confirmation of verification may be presented to a human, such as a checkout attendant at a store, in which case the confirmation of verification can comprise human-readable elements. The human may alternatively or additionally scan or read a machine-readable part of the verification confirmation, such as a dynamic QR code, using suitable hardware such as a QR scanner. In one such example use case, the disclosed method may be used in the context of home delivery. A delivery person may deliver a package to a customer and perform attribute verification to ensure the customer is the correct recipient and/or is of a required minimum age to receive the package in question. In that case, the delivery person may have their own computing device which is configured to scan a confirmation of verification presented by the recipient on their own user device, in the manner discussed above.

In an alternative implementation, no human attendant is present and the confirmation of verification may then simply be presented to a machine interface, such as a QR scanner on a self-checkout machine or automated vending machine. In this manner, attribute verification can be entirely automated. In one example, for example in a store where checkout-free shopping is enabled, the user may download a host application associated with the store. The host application can then communicate with the attribute verification application on the user's device to confirm attribute verification. For example, the user may confirm they are over a minimum age in the usual way, and confirmation of this may be transmitted to the host application associated with the store. As a result, the user may be permitted to leave the store with an item which has an associated minimum age without passing through a checkout. In an alternative implementation, confirmation of verification is presented or transmitted to an automated vending machine. On receipt of this confirmation, the automated vending machine can release an item, such as an age-restricted good, to the user. This addresses a drawback of existing system that age-restricted goods cannot be securely sold through vending machines.

In some examples, confirmation of age verification may comprise a digital proof of age, DPoA, certificate. In some implementations, this certificate follows the known PASS 5 DPoA standards. This can enable seamless integration of the disclosed age verification mechanisms into existing procedures already used in stores and establishments for proof of age.

In the above use example described in relation to FIG. 7, each establishment described has its own associated verification application. In other examples, it may be possible to use a verification application associated with a first establishment or company to verify attributes at a second establishment or company. In some examples, a single application may function for some or all establishments.

In some examples, verification may be triggered by a challenge notification. For example, a user may scan an attribute verification element at a checkout, such as a QR code. This may trigger the verification application to begin attribute verification.

In some examples, verification may be time-limited. For example, after a pre-determined time threshold the verification may no longer be valid or useable and/or the software application may prompt the user to re-verify themselves by capturing a new biometric verification data. The time threshold may be, for example, 10 seconds, 20 seconds, 30 seconds, 40 seconds, 50 seconds, 60 seconds, 2 minutes, 5 minutes, 10 minutes, or an hour. Each of these time thresholds would provide at least some protection against identity spoofing.

It will be appreciated that the verification confirmation shown in FIG. 5 is merely an example. Certain elements may be omitted or added to the confirmation shown. For example, the confirmation may include more or fewer elements of human-readable data. In one implementation the confirmation includes the authenticated biometric data of the user and/or the biometric registration data of the user and/or the biometric verification data of the user.

Whilst the above description has focussed on verifying user attributes such as age and identity in the context of a store or venue, it will be appreciated that other use cases may exist. For example, the disclosed functionality may be used in order to allow access to a device such as a personal computer, or to online sales or age restricted websites on such a computer. The disclosed systems may enable access to a person's home and may thereby provide home security functionality. The disclosed systems may be used in the context of home delivery to prove the identity of a recipient of a package. The disclosed systems may be used in the context of an automated vending machine.

Finally, whilst the above description has focussed on use of biometric data such as images (particularly facial images), fingerprints, and iris detail, it will be apparent that any suitable biometric data which allows a user to be identified may be used in the context of the disclosed methods. More than one biometric aspect may be checked for in the same verification or registration procedure. Verification may involve verification of more than one attribute associated with the user, for example both age and name.

Computer System

Figure 8:
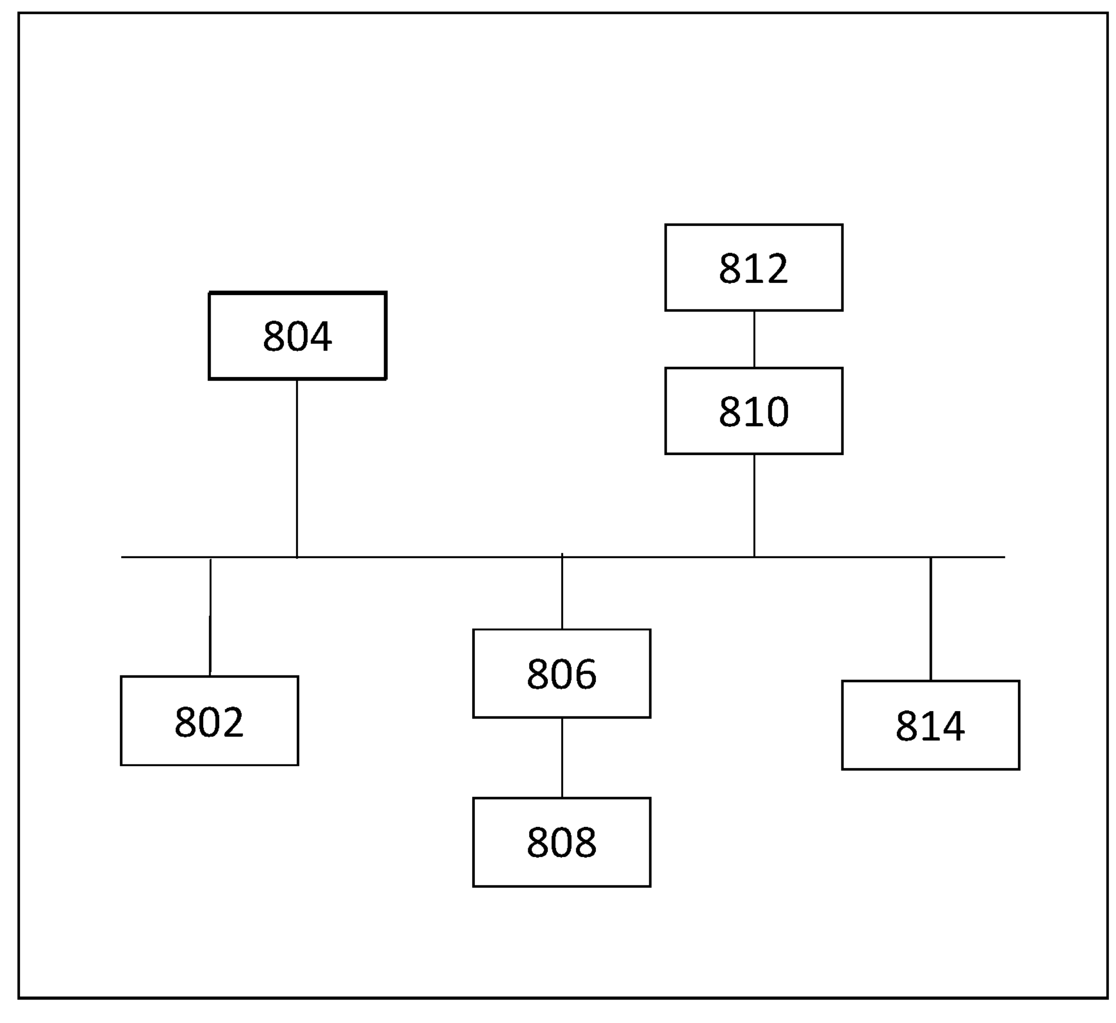
FIG. 8 is a schematic representation of a computing device which may be used to perform the methods of the present disclosure.

Turning finally to FIG. 8, FIG. 8 shows a schematic and simplified representation of a computer apparatus or computing device 800 which can be used to perform the methods described herein. For example, computing device 800 may be user device 200, 500 and/or a querying device as described above. Computing device 800 may be a mobile computing device such as a mobile phone or smartphone. Computing device 800 may alternatively be a terminal or checkout device provided at a store or venue.

The computer apparatus 800 comprises various data processing resources such as a processor 802 (in particular a hardware processor) coupled to a central bus structure. Also connected to the bus structure are further data processing resources such as memory 804. A display adapter 806 connects a display device 808 to the bus structure. One or more user-input device adapters 810 connect a user-input device 812, such as a keyboard and/or a mouse to the bus structure. In some examples, user input device 812 is part of display device 808, such as where a smartphone is provided with a touchscreen display. One or more communications adapters 814 are also connected to the bus structure to provide connections to other computer systems 800 and other networks.

In operation, the processor 802 of computer system 800 executes a computer program comprising computer-executable instructions that may be stored in memory 804. When executed, the computer-executable instructions may cause the computer system 800 to perform one or more of the methods described herein. The results of the processing performed may be displayed to a user via the display adapter 806 and display device 808. User inputs for controlling the operation of the computer system 800 may be received via the user-input device adapters 810 from the user-input devices 812.

It will be apparent that some features of computer system 800 shown in FIG. 8 may be absent in certain cases. For example, one or more of the plurality of computer apparatuses 800 may have no need for display adapter 806 or display device 808. This may be the case, for example, for particular server-side computer apparatuses 800 which are used only for their processing capabilities and do not need to display information to users. Similarly, user input device adapter 810 and user input device 812 may not be required. In its simplest form, computer apparatus 800 comprises processor 802 and memory 804.

While various specific combinations of components and method steps have been described, these are merely examples. Components and method steps may be combined in any suitable arrangement or combination. Components and method steps may also be omitted to leave any suitable combination of components or method steps.

The described methods may be implemented using computer executable instructions. A computer program product or computer readable medium may comprise or store the computer executable instructions. The computer program product or computer readable medium may comprise a hard disk drive, a flash memory, a read-only memory (ROM), a CD, a DVD, a cache, a random-access memory (RAM) and/or any other storage media in which information is stored for any duration (e.g., for extended time periods, permanently, brief instances, for temporarily buffering, and/or for caching of the information). A computer program may comprise the computer executable instructions. The computer readable medium may be a tangible or non-transitory computer readable medium. The term "computer readable" encompasses "machine readable".

The singular terms "a" and "an" should not be taken to mean "one and only one". Rather, they should be taken to mean "at least one" or "one or more" unless stated otherwise. The word "comprising" and its derivatives including "comprises" and "comprise" include each of the stated features, but does not exclude the inclusion of one or more further features.

The above implementations have been described by way of example only, and the described implementations are to be considered in all respects only as illustrative and not restrictive. It will be appreciated that variations of the described implementations may be made without departing from the scope of the disclosure. It will also be apparent that there are many variations that have not been described, but that fall within the scope of the appended claims.

Also disclosed are the following numbered clauses:

1. A computer-implemented method of locally verifying an attribute associated with a user, the method comprising performing, by a computing device, steps including:

capturing biometric verification data using the computing device;

determining whether the biometric verification data corresponds to the user by comparing the biometric verification data with authenticated biometric data of the user previously obtained from an identity document, ID, and stored locally on the computing device; and in response to determining that the biometric verification data corresponds to the user, verifying the attribute associated with the user based on attribute information associated with the user previously obtained from the ID and stored locally on the computing device.

2. The computer-implemented method of clause 1, wherein the biometric verification data comprises a verification image captured using a camera of the computing device and the authenticated biometric data comprises an authenticated image of the user.

3. The computer-implemented method of clause 1 or 2, wherein the biometric verification data comprises a verification fingerprint captured using a fingerprint scanner of the computing device and the authenticated biometric data comprises an authenticated fingerprint of the user.

4. The computer-implemented method of any preceding clause, wherein the computing device comprises a mobile device.

5. The computer-implemented method of any preceding clause, wherein the attribute associated with the user is an age of the user.

6. The computer-implemented method of any preceding clause, wherein the attribute associated with the user is verified without requiring transmission of personally identifiable information, PII, from the computing device.

7. The computer-implemented method of any preceding clause, wherein verifying the attribute associated with the user comprises accessing a certificate stored locally on the computing device, said certificate comprising the attribute information associated with the user and, preferably, the authenticated biometric data of the user, preferably wherein the certificate is encrypted.

8. The computer-implemented method of any preceding clause, wherein the steps further include providing a confirmation of the verified attribute associated with the user.

9. The computer-implemented method of clause 8, wherein providing the confirmation comprises presenting the confirmation on a display of the computing device.

10. The computer-implemented method of clause 9, wherein the confirmation is machine-readable.

11. The computer-implemented method of clause 10, wherein the confirmation comprises a QR code, preferably wherein the QR code is a dynamic QR code.

12. The computer-implemented method of any of clauses 8-11, wherein providing the confirmation comprises transmitting a message confirming the verified attribute associated with the user.

13. The computer-implemented method of any of clauses 8-12, wherein the steps further include:

obtaining spatiotemporal information associated with verification of the attribute associated with the user; and embedding the obtained spatiotemporal information in the confirmation of the verified attribute.

14. The computer-implemented method of clause 13, wherein the spatiotemporal information comprises information relating to one or more of:

a current date;

a current time;

a current location; and an identity of an establishment where verification of the attribute associated with the user is taking place.

15. The computer-implemented method of any preceding clause, wherein the steps further include, prior to capturing the biometric verification data:

obtaining, from the ID document, the authenticated biometric data of the user and the attribute information associated with the user;

capturing biometric registration data using the computing device;

determining whether the biometric registration data corresponds to the user by comparing the biometric registration data with the authenticated biometric data; and in response to determining that the biometric registration data corresponds to the user, storing locally at the computing device:

a) the authenticated biometric data of the user; and b) the attribute information associated with the user.

16. The computer-implemented method of clause 15, wherein obtaining the authenticated biometric data of the user and/or the attribute information associated with the user comprises capturing an image of the ID using the camera of the computing device.

17. The computer-implemented method of clause 15 or 16, wherein obtaining the authenticated biometric data of the user and/or the attribute information associated with the user comprises interrogating a memory of the ID.

18. The computer-implemented method of clause 17, wherein the ID is a passport and/or the memory is a wireless data transfer chip, preferably an ePassport NFC chip.

19. The computer-implemented method of any preceding clause, wherein determining whether the biometric verification data and/or the biometric registration data corresponds to the user comprises performing one or more anti-spoofing procedures.

20. A computer-implemented method of configuring a computing device for verifying an attribute associated with a user, the method comprising performing, by the computing device, steps including:

a) obtaining, from an identity document, ID, authenticated biometric data of the user and attribute information associated with the user;

b) capturing biometric registration data using the computing device;

c) determining whether the biometric registration data corresponds to the user by comparing the biometric registration data with the authenticated biometric data; and d) in response to determining that the biometric registration data corresponds to the user, storing locally at the computing device:

i) the authenticated biometric data of the user; and ii) the attribute information associated with the user.

21. The computer-implemented method of clause 20, wherein the computing device comprises a mobile device.

22. The computer-implemented method of clause 20 or 21, wherein said storing locally at the computing device comprises embedding the authenticated biometric data of the user and the attribute information associated with the user in a certificate and storing the certificate locally at the computing device, preferably wherein the certificate is encrypted.

23. The computer-implemented method of any of clauses 20-22, wherein the authenticated biometric data of the user and the attribute information associated with the user are stored such that they are accessible to more than one software application running on the computing device.

24. The computer-implemented method of clause 23, wherein steps a)-d) are performed by a first software application running on the computing device, and wherein the method subsequently further comprises:

e) accessing, by a second software application running on the computing device, the authenticated biometric data of the user and the attribute information associated with the user stored locally at the computing device; and f) configuring the second software application to enable verification of the attribute associated with the user, by the second software application.

25. The computer-implemented method of clause 24, wherein the method further comprises:

g) verifying, by the second software application, the attribute associated with the user.

26. A computing device configured to perform the method of any preceding clause; or A computer-readable medium comprising instructions which, when executed by a processor of a computing device, cause the computing device to perform the method of any preceding clause; or A computer program comprising instructions which, when the program is executed by a computing device, cause the computing device to perform the method of any preceding clause.

27. A system comprising:

a computing device configured to perform the method of any of clauses 1-25 for verification of an attribute associated with a user; and a querying device configured to receive confirmation of the verified attribute associated with the user from the computing device.

28. A system comprising:

a computer program comprising instructions which, when the program is executed by a computing device, cause the computing device to perform the method of any of clauses 1-25; and a computer program comprising instructions which, when the program is executed by a querying device, configure the querying device to receive confirmation of the verified attribute associated with the user from the computing device.

29. The system of clause 27 or 28, wherein the querying device comprises a point of sale, POS, device, preferably a self-checkout machine; and/or wherein the computing device comprises a mobile device.

30. The system of any of clauses 27-29, wherein receiving confirmation of the verified attribute associated with the user from the computing device comprises scanning, by the querying device, a display of the computing device.

The invention claimed is:

1. A computer-implemented method of locally verifying an age of a user, the method comprising performing, by a computing device, steps including:

capturing a biometric verification data using the computing device;

determining whether the biometric verification data corresponds to the user by comparing the biometric verification data with an authenticated biometric data of the user previously obtained from an identity document, ID, and stored locally on the computing device;

in response to determining that the biometric verification data corresponds to the user, verifying the user's age based on an attribute information associated with the user previously obtained from the ID and stored locally on the computing device; and presenting, on a display of the computing device, a machine-readable confirmation of verification of the user's age.

2. The computer-implemented method of claim 1, wherein:

the biometric verification data comprises a verification image captured using a camera of the computing device and wherein the authenticated biometric data comprises an authenticated image of the user; and/or the biometric verification data comprises a verification fingerprint captured using a fingerprint scanner of the computing device and wherein the authenticated biometric data comprises an authenticated fingerprint of the user.

3. The computer-implemented method of claim 1, wherein the user's age is verified without requiring transmission of a personally identifiable information, PII, from the computing device.

4. The computer-implemented method of claim 1, wherein verifying the user's age comprises accessing a certificate stored locally on the computing device, said certificate comprising the attribute information associated with the user.

5. The computer-implemented method of claim 1, wherein the steps further include providing a human-readable confirmation of the verified user's age.

6. The computer-implemented method of claim 5, wherein providing the machine-readable confirmation or the human-readable confirmation comprises transmitting a message confirming the verified user's age.

7. The computer-implemented method of claim 5, wherein the steps further include:

obtaining a spatiotemporal information associated with verification of the user's age; and embedding the spatiotemporal information in the confirmation of the verified user's age.

8. The computer-implemented method of claim 1, wherein the steps further include, prior to capturing the biometric verification data:

obtaining, from the ID, the authenticated biometric data of the user and the attribute information associated with the user;

capturing a biometric registration data using the computing device;

determining whether the biometric registration data corresponds to the user by comparing the biometric registration data with the authenticated biometric data; and in response to determining that the biometric registration data corresponds to the user, storing locally at the computing device:

a) the authenticated biometric data of the user; and b) the attribute information associated with the user.

9. The computer-implemented method of claim 8, wherein obtaining the authenticated biometric data of the user and/or the attribute information associated with the user comprises:

capturing an image of the ID using a camera of the computing device; and/or interrogating a memory of the ID.

10. A computer program stored on a non-transitory computer-readable medium and comprising instructions which, when executed by a computing device, cause the computing device to perform the method of claim 1.

11. A system comprising:

a computing device configured to perform the steps of:

capturing a biometric verification data using the computing device;

determining whether the biometric verification data corresponds to a user by comparing the biometric verification data with an authenticated biometric data of the user previously obtained from an identity document, ID, and stored locally on the computing device;

in response to determining that the biometric verification data corresponds to the user, verifying a user's age based on an attribute information associated with the user previously obtained from the ID and stored locally on the computing device; and presenting, on a display of the computing device, a machine-readable confirmation of verification of the user's age; and a querying device configured to read the confirmation of the verified user's age from the computing device.

12. The computer-implemented method of claim 1, wherein the confirmation comprises a QR code.

13. The computer-implemented method of claim 1, wherein the confirmation is time-limited.

14. The computer-implemented method of claim 7, wherein the spatiotemporal information comprises information relating to one of more of: a current date; a current time; a current location; and an identity of an establishment where verification of the attribute associated with the user is taking place.

15. The computer-implemented method of claim 9, wherein the ID is a passport and/or the memory is a wireless data transfer chip.

16. The computer-implemented method of claim 1, wherein the computing device is a mobile device.

* * * * *